(12) United States Patent
Joachim

(10) Patent No.: US 11,783,239 B2
(45) Date of Patent: *Oct. 10, 2023

(54) METHODS AND SYSTEMS FOR MANAGING SIMULTANEOUS EVENTS

(71) Applicant: Joshua Christopher Joachim, Katy, TX (US)

(72) Inventor: Joshua Christopher Joachim, Katy, TX (US)

(*) Notice: Subject to any disclaimer, the term of this patent is extended or adjusted under 35 U.S.C. 154(b) by 218 days.

This patent is subject to a terminal disclaimer.

(21) Appl. No.: 17/206,206

(22) Filed: Mar. 19, 2021

(65) Prior Publication Data
US 2021/0279650 A1    Sep. 9, 2021

Related U.S. Application Data

(63) Continuation of application No. 16/199,298, filed on Nov. 26, 2018, now Pat. No. 10,956,836, which is a continuation-in-part of application No. 14/562,191, filed on Dec. 5, 2014, now abandoned, which is a continuation of application No. 14/556,810, filed on Dec. 1, 2014, now abandoned.

(60) Provisional application No. 61/910,869, filed on Dec. 2, 2013.

(51) Int. Cl.
*G06Q 10/02* (2012.01)
*G06Q 50/00* (2012.01)

(52) U.S. Cl.
CPC ............ *G06Q 10/02* (2013.01); *G06Q 50/01* (2013.01)

(58) Field of Classification Search
CPC ........ G06Q 10/02; G06Q 10/025; G06Q 50/01
See application file for complete search history.

(56) References Cited

U.S. PATENT DOCUMENTS

| | | | |
|---|---|---|---|
| 2003/0187802 A1* | 10/2003 | Booth | G06Q 10/02 705/59 |
| 2006/0212932 A1* | 9/2006 | Patrick | H04L 63/1441 726/13 |
| 2007/0250354 A1* | 10/2007 | Neulight | G06Q 10/02 705/5 |
| 2009/0326992 A1* | 12/2009 | Junkin | G06Q 10/02 705/26.1 |
| 2013/0073324 A1* | 3/2013 | Liu | G06Q 10/02 705/5 |
| 2014/0173078 A1* | 6/2014 | McCord | H04L 65/80 709/223 |
| 2014/0257879 A1* | 9/2014 | Sink | G06Q 10/02 705/5 |
| 2015/0019273 A1* | 1/2015 | Grosz | G06Q 10/02 705/5 |

(Continued)

OTHER PUBLICATIONS

Russo, StageStarter. A new music event start up, 2014 (Year: 2014).*

(Continued)

*Primary Examiner* — Daniel Vetter
(74) *Attorney, Agent, or Firm* — Pierson IP, PLLC

(57) ABSTRACT

Embodiments disclosed herein provide systems and methods for a crowd-funding server for users to pledge to purchase tickets to an event based on a number of users that have pledged to purchase tickets for an event and the gender ratio of the users that have pledged to purchase the tickets for the event.

2 Claims, 24 Drawing Sheets

(56) References Cited

U.S. PATENT DOCUMENTS

| | | | | |
|---|---|---|---|---|
| 2015/0242947 | A1* | 8/2015 | Wilson | G06Q 10/02 |
| | | | | 705/5 |
| 2016/0132790 | A1* | 5/2016 | Weissman | G06Q 10/02 |
| | | | | 705/5 |
| 2017/0323360 | A1* | 11/2017 | Gurunathan | G06Q 30/0611 |
| 2017/0337521 | A1* | 11/2017 | Godbole | G06Q 10/1095 |

OTHER PUBLICATIONS

Netzer, Race Condition Detecting for Debugging Shared-memory Parallel Programs, Univ. of Wisconsin Thesis, 1991 (Year: 1991).*

* cited by examiner

METHODS AND SYSTEMS FOR MANAGING SIMULTANEOUS EVENTS

CROSS-REFERENCE TO RELATED APPLICATIONS

This application claims a benefit of priority under 35 U.S.C. § 119 to Provisional Application No. 61/910,869 filed on Dec. 2, 2013 and this application claims a benefit under 35 U.S.C. § 120 of prior filed Non-Provisional application Ser. No. 14/556,810 filed on Dec. 1, 2014 which are fully incorporated herein by reference in its entirety.

BACKGROUND INFORMATION

Field of the Disclosure

Examples of the present disclosure relate to techniques for event booking. More particularly, embodiments are related to booking an event based in part on a male to female ratio of the people who pledge to purchase tickets.

Background

Conventional crowd-funding platforms for events allow promoters and venues to generate funding before events are booked. When using conventional crowd-funding platforms, once sufficient funding to be a profitable event is obtained, or a sufficient number of people have pledged to purchase tickets to the event, an event is booked. However, conventional crowd-funding platforms do not take into account a gender ratio of people who pledged to purchase tickets to the event.

More so, when using a conventional crowd-funding platform, a user may pledge to purchase a ticket for an event, and once the event is booked the user will be automatically charged for the pledged ticket. However, circumstances may arise where the user has pledged to purchase tickets to a plurality of events, while only being able to attend a single event. If an event is booked, the user is required to immediately delete all of his other pledges to purchase tickets to the other events.

Using conventional crowd-funding platforms is even more daunting when a group of users desire to go to an event together. If the group members desire to attend a single event, but are indifferent about what event they attend, the group members must communicate with each other to determine events they have pledged to purchase tickets for. Once one of the events is booked, each of the group members must independently delete their pledges to purchase tickets to other events before those events are booked.

Accordingly, needs exist for more efficient crowd-funding platforms that allow groups to more efficiently and effectively manage pledges to purchase tickets for events, while controlling the gender ratio associated with the event.

SUMMARY

Embodiments disclosed herein provide systems and methods for a crowd-funding server configured to allow users to pledge to purchase tickets to multiple events, and an event is booked based in part on a number of users that have pledged to purchase tickets for the event and the gender ratio of the users that have pledged to purchase the tickets for the event. In embodiments, the crowd-funding server maximizes the likelihood that a group of friends may purchase tickets to the same event, increases the likelihood of a booked event for a venue, and/or increases the likelihood that a user may purchase a ticket to a successful event by allowing a group to make pledges to purchase tickets to multiple events.

Additionally, the crowd-funding server may make the process of pledging to purchase tickets to events as efficient and effective as possible by having automatic steps. By using the crowd-funding server, venues may create a reputation for hosting events that meet and/or exceed the expectations In embodiments, the crowd-funding server may receive event data to create an event from an associate of a venue, wherein a venue may be any building, structure, or place where an event may occur. For example, a venue may be a bar, sporting arena, concert hall, movie theater, park, pool, etc. and an event may be a party, concert, play, sporting competition, etc. To generate an event, the associate of the venue may perform actions to input attributes associated with the event. An associate of the venue may create an event using the crowd-funding server to guarantee and control the pre-sale of tickets prior to booking the event, thus reducing or eliminating the financial risk of an unsold or undersold booking. The attributes may include a maximum number of people that the venue desires at the event, which may be a percentage of the venue's maximum capacity, ratio data, threshold data, type of foods and/or drinks to be provided at the event, activities to be held at the event, etc. In embodiments, to ensure, safeguard, or maintain the male to female ratio during the event, the venue may provide an incentive for people to stay at the event, and may not allow other people that did not pledge to purchase tickets to the event to attend the event. For example, an attribute of the event may be an open bar, discounted rate for drinks, bar tab, a concert, etc., where users that purchased tickets to the event are incentivized to stay at the event. In embodiments, responsive to the associate of the venue creating an event with a maximum number of people allowed at the event, ratio threshold may be determined. The threshold data may include a male threshold associated with the minimum number of males desired to attend the event and a female threshold associated with the minimum number of females desired to attend the event, wherein the male threshold and/or the female threshold may be any desired percentage of the maximum number of people allowed at an event. For example, the male threshold and female threshold may be set by the associate to be fifty percent of the maximum number of people allowed at an event. In other embodiments, the male threshold and the female threshold may be set to different percentages or values, which may or may not equal one hundred percent of the total threshold.

In embodiments, the crowd-funding server may receive data from a user to create a group including at least one user. The group may include a login and/or password which may be used to link profiles of the users of the group. The group may be comprised of all male members, all female members, or a combination of male and female members. Responsive to a group being created, any member of the group may pledge to purchase tickets for an event on behalf of the group, wherein if the event is booked each authorized member of the group is required to purchase a ticket for the event.

In further embodiments, an administrator or administrators may be assigned to a group, where only the administrators may pledge to purchase tickets for an event.

In embodiments, a waitlist may be created when a group of users that pledged to purchase tickets of an event would cause the number of males or females attending the event to be greater than the maximum number of males or females allowed at the event, respectively, if the event is successfully booked. Therefore, any group including males and/or females that would like to pledge to purchase tickets to the event, but doing so would cause either the number of males or females to be greater than the maximum number of males or females allowed at the event respectively, may be placed on the waitlist.

In embodiments, if other groups or users delete their pledges to purchase tickets for the event, then the number of pledges to purchase tickets to an event corresponding to males or females may become low enough to allow the group to fit without causing the number of males or females at the event to be greater than the maximum number of males or females allowed at the event, respectively. In other words, responsive to the number of males and/or females pledging to purchase tickets to an event being changed, the group may be removed from the waitlist and pledge to purchase tickets to the event if allowing the group does not cause the number of males or females at the event to be greater than the maximum number of males or females allowed at the event, respectively.

In further embodiments, there may be a buffer zone between the maximum number of males or females allowed at an event and the male threshold and female threshold, respectively, wherein the maximum number of males or females allowed at the event may be greater than the male and female thresholds, respectively. Groups may be taken off the waitlist if by taking the group off the waitlist of the event does not include a number of males and females greater than the maximum number of males and females allowed at the event.

In embodiments, once an event has enough pledges to purchase tickets from a number of males greater than or equal to the male threshold and a number of females greater than or equal to the female threshold the event may get booked, and the crowd-funding server may automatically purchase the ticket that each authorized member of the group pledged to purchase. Responsive to the event being booked, the crowd-funding server may automatically delete all of the other pledges to purchase tickets to other events that the group had pledged to purchase tickets to attend. Therefore, the group can pledge to purchase tickets to multiple events without fear of actually having to purchase tickets to multiple events.

In further embodiments, users of the crowd-funding server may be able to view profiles associated with other users in an online community. While viewing profiles on the online community, a first user may perform actions on a client computing device to identify that the first user likes another user, and the other users on the online community may perform actions on their client computing device to identify that they like the first user. If the first user and the other users of the online community have both performed actions on their client computing devices to like each other, it may be determined that the users have formed a mutual interest connection. While viewing events to pledge to purchase a ticket for, the first user may view how many other users that have already pledged to purchase a ticket to a specific event have a mutual interest connection with the first user. In other embodiments, the user may be able to view how many users at each event that the first user has liked, how many other users have liked the first user, and/or how many other users the first user has a mutual interest connection with. Therefore, the first user may be more inclined to pledge to purchase tickets for events that have a higher number of mutual interest connections, as well as which events have more users they like and have more users that like them. In other words, this helps the user determine which events the user may most desire to attend.

In further embodiments, the first user may be able to see pictures, only a first name, an entire name, or further information associated with users that have pledged to purchase tickets to an event that have formed a mutual interest connection with the first user, that the first user has liked, and/or who has liked the first user before an event is successful. However, the first user may not be given any contact information about the users that the first user has a mutual connection with, that the first user likes, and/or who likes the first user to prevent unwanted actions or communications with a false identity or robot.

In embodiments, the first user may be able to see how many other users at a booked event have formed a mutual interest connection with the first user, how many users at a booked event the first user likes, and/or how many users at a booked event like the first user. In embodiments, the first user may only be able to see the number of other users that have formed a mutual interest connection with the first user, how many users at the event the first user likes, and/or how many users at the booked event like the first user and not the contact information or any information associated with the other users.

In further embodiments, the first user may be able to see pictures, only a first name, an entire name, or further information associated with users at the event that have formed a mutual interest connection with the first user, that the first user likes, and/or that have liked the first user once an event is booked. This helps users meet one another at the booked event without the crowd-funding server ever letting the users contact one another beforehand.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Figure 1:
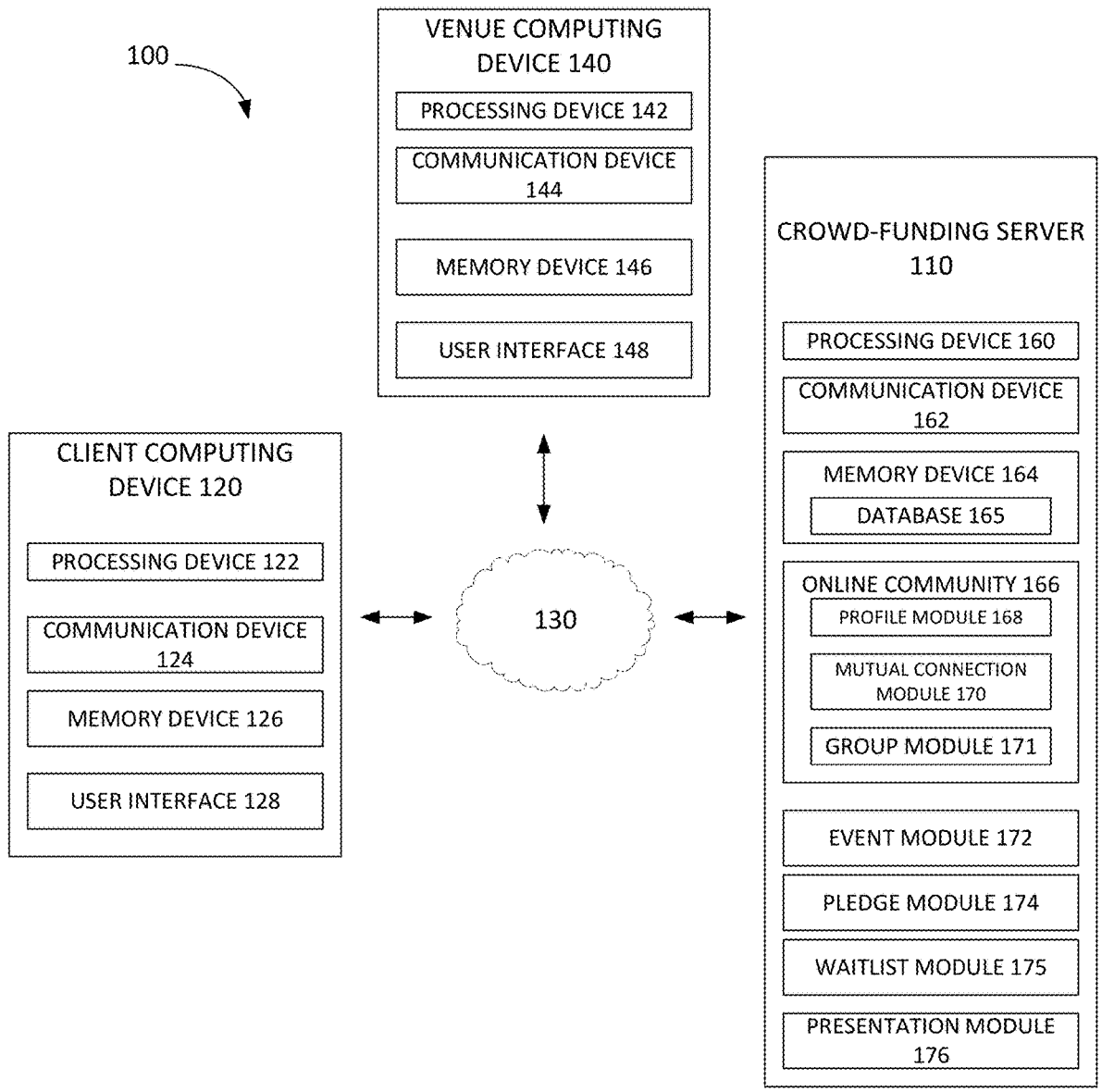
FIG. 1 depicts one embodiment of a topology of a network to book an event.

Turning now to FIG. 1, FIG. 1 depicts one topology 100 for booking an event. Topology 100 may include crowd-funding server 110, client computing device 120, and a venue client computing device 140. The elements depicted in topology 100 may be communicatively coupled to each other over network 130.

Network 130 may be a wired or wireless network such as the Internet, an intranet, a LAN, a WAN, a cellular network or another type of network. It will be understood that network 130 may be a combination of multiple different kinds of wired or wireless networks.

Crowd-funding server 110 may be a computing device, such as a general hardware platform server configured to support mobile applications, software, and the like executed on client computing device 120 and/or venue computing device 140. Crowd-funding server 110 may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Crowd-funding server 110 may include any combination of one or more computer-usable or computer-readable media. For example, crowd-funding server 110 may include a computer-readable medium including one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device.

In embodiments, crowd-funding server 110 may include a processing device 160, a communication device 162, a memory device 164, an online community module 166, an event module 172, a pledge module 174, and a presentation module 176.

Processing device 160 may include memory, e.g., read only memory (ROM) and random access memory (RAM), storing processor-executable instructions and one or more processors that execute the processor-executable instructions. In embodiments where processing device 160 includes two or more processors, the processors may operate in a parallel or distributed manner. Processing device 160 may execute an operating system of crowd-funding server 110 or software associated with other elements of crowd-funding server 110.

Communication device 162 may be a device that allows crowd-funding server 110 to communicate with another device over network 130. Communication device 162 may include one or more wireless transceivers for performing wireless communication and/or one or more communication ports for performing wired communication.

Memory device 164 may be a device that stores data generated or received by crowd funding server 110. Memory device 164 may include, but is not limited to a hard disc drive, an optical disc drive, and/or a flash memory drive. In embodiments, memory device 164 may be configured to store information received from client computing device 120 and/or venue computing device 140. The information stored within memory device 164 may be accessed by processing device 160, communication device 162, and/or modules 166, 168, 170, 172, 174, 175, 176. In embodiments, memory device 164 may include a database configured to store profile information associated with a user of first client computing device 120 or event information associated with an event or venue using venue computing device 140. For example, memory device 164 may be configured to store user profiles for online community module 166, event information for event module 172, and/or pledge information associated with what groups of users have pledged to purchase tickets to events for pledge module 174.

Online community module 166 may be a hardware device configured to allow different users of client computing device(s) 120 to access and/or manage one or more user profiles, to form mutual and non-mutual interest connections with other members of the online community, and to form groups of members of the online community. In embodiments, online community module 166 may include profile module 168, mutual interest connection module 170, and group module 171.

Profile module 168 may be configured to allow the users of a client computing device 120 to generate and create profiles to interact with others on the online community via crowd-funding server 110. The one or more user profiles and/or user information may include information stored in database 165, one or more of the client computing devices 120, and/or other storage locations. The user profiles may include, for example, information identifying users (e.g., a username or handle, a number, an identifier, and/or other identifying information) within an online community, security login information (e.g., a login code or password), pictures of the user, biographic information of the user such as the users height, weight, etc., relationship information (e.g., information related to relationships between users in the online community, demographic information associated with users, an amount of money to spend on an event, and/or other information related to user of the online community).

Mutual connection module 170 may be configured to receive like information from client computing device 120 indicating that a first user is interested in a second user of online community. Responsive to receiving the like information from the first user associated with client computing device 120, mutual connection module 170 may store an entry in database 165 indicating that the first user associated with client computing device 120 is interested in a second user of online community. The stored entry may include an identifier of the first user (i.e. the first users login name), and an identifier of the second user (i.e. the second users login name). If mutual connection module 170 receives like information from the second user of online community indicating that the second user is interested in the first user of the online community, mutual connection module 170 may store an entry in database 165 indicating that the second user is interest in the first user. When connection module 170 receives like information from both the first user and the second user indicating that they are interested in one another, connection module 170 may determine that the first user and the second user have a mutual interest connection. In embodiments, if there is a mutual interest connection between two users, the users may be able to view more or less profile information associated with the corresponding user.

Group module 171 may be configured to establish groups or relationships between users within the online community. Such groups may include one or more of friendships, connections, followers, and/or other relationships between users of the online community. Group module 171 may establish relationships based on relationship requests and acceptances received from users of users. Establishment of a group may be initiated by a single communication request initiating formation of a group by providing a group name and/or password. One or more other users may subsequently join the group by providing this group name and/or password.

In embodiments, responsive to a group being formed, any user of the group may pledge to purchase tickets to an event, wherein each authorized member of the group is required to pledge to purchase tickets to the event. In other embodiments, an administrator or administrators may be assigned to a group, and only the administrators may pledge to purchase tickets for an event on behalf of the group.

Event module 172 may be a hardware processor configured to receive data to create an event. An event may be created by an associate of a venue, responsive to the associate performing commands on venue computing device 140. The event may have a plurality of attributes. The attributes associated with the event may include a maximum number of people that the venue may desire to have present at the event, which may be a percentage of the venue's maximum capacity, a date and time for the event, a critical date associated with a date and/or time that the event must be booked by, threshold data, ticket pricing, types of foods and/or drinks to be provided at the event, activities to be held at the event, etc. The threshold data may include a male threshold associated with the number of males desired to attend the event and a female threshold associated with the number of females desired to attend the event. The threshold data may be based on the maximum number of people allowed at the event, wherein the male threshold and/or the female threshold may be any desired percentage, ratio, value, etc. of the maximum number of people allowed at the event.

In embodiments, event module 172 may be configured to book an event responsive to the number of males that have pledged to purchase tickets to an event being greater than or equal to the male threshold, and the number of females that have pledged to purchase tickets to an event being greater than or equal to the female threshold. If the number of males and females is not above or equal to male threshold and the female threshold, respectively, by the critical date then the event may not be booked.

Event module 172 may receive an attribute associated with a maximum number of tickets allocated to males and/or females to pledge to purchase tickets to the event, wherein the maximum number of tickets allocated to males may be the same number or a different number of tickets allocated to females. The maximum number of tickets allocated to males and/or females may be greater than the male threshold and/or the female threshold, respectively, wherein the amount of tickets between the maximum number of tickets allocated to males and/or females and the male threshold and the female thresholds, respectively, may be buffer zones. Responsive to their being a number of males and females that have pledged to purchase tickets to the event inside the buffer zones associated with males and females for an event, the event may be automatically booked. In further embodiments, the maximum number of tickets allocated to males and/or females may be the same number as the male threshold and the female threshold, respectively.

Event module 172 may also be configured to book an event once an event has enough pledges to purchase tickets from a number of males greater than or equal to the male threshold and a number of females greater than or equal to the female threshold. Responsive to an event being booked, event module 172 may automatically purchase the ticket that each authorized member of the group pledged to purchase for the event, and automatically delete all of the other pledges to purchase tickets to other events that the group had pledged to purchase tickets for. Therefore, the group can pledge to purchase tickets to multiple events without fear of having to purchase tickets to multiple events.

Pledge module 174 may be a hardware processor configured to receive information from users operating client computing device 120 indicating that a user and/or group (referred to hereinafter collectively and independently as group) desires to pledge to purchase tickets to an event. Responsive to receiving the information that the group desires to pledge to purchase tickets to an event, pledge module 174 may update entries in database 165 associated with each authorized member of the group indicating that the authorized members of the group have pledged to purchase tickets to the event and a time stamp when the information is received. The pledge to purchase tickets may indicate that if the event is booked, each authorized member of the group will purchase their corresponding ticket. If the event is not booked, then the authorized members of the group will not be required to purchase tickets to the event.

When an event is booked, the tickets may be delivered to the venue with the name, sex, and/or date of birth for each user that purchased a ticket to the event. Upon arrival to the event, the venue may match a photo identification with the delivered name, sex, and/or date of birth for the user. If the information matches, the venue may provide a wristband to the user, and the user may be allowed access to the event.

In embodiments, pledge module 174 may ensure that a user will purchase a ticket to the event by requiring the user to deposit money into crowd-funding server 110 before being able to pledge to purchase tickets to events. This money may be automatically withdrawn once the event is booked. In other embodiments, responsive to a user pledging to purchase a ticket to an event, or before allowing a user to pledge to purchase a ticket to an event, a pending charge may be charged to a credit card associated with the user. If the event is successful, the pending charge may result in an actual charge, however if the event is unsuccessful the pending charge may be withdrawn.

Waitlist Module 175 may be a hardware processor configured to manage a waitlist for an event based on the number of males that have pledged to purchase tickets to the event, the number of females that have pledged to purchase tickets to the event, the male threshold for the event, the female threshold for the event, the maximum number of males allowed at the event, the maximum number of females allowed at the event, the number of males and females in a group, and/or timestamp data associated with a user and/or group.

In embodiments, if a group pledges to purchase tickets to an event, and doing so would cause the number of males or females that have pledged to purchase tickets to go over the maximum number of males or females allowed at an event respectively, then the group may be placed on a waitlist to pledge to purchase tickets for the event. The group may be given a timestamp when the group desired to purchase tickets to the event. Subsequent to another user joining the group, the timestamp associated with the group for the event will not change.

If other groups delete their pledges to purchase tickets for the event, then the number of pledges to purchase tickets to an event by males or females may become low enough to allow a group on the waitlist to pledge to purchase tickets to the event.

Responsive to a change in number of males and/or females pledging to purchase tickets to an event, the group with the earliest timestamp to purchase tickets to the event may be removed from the waitlist and pledge to purchase tickets to the event. The group may be removed from the waitlist if the number of males in the group does not cause the number of males pledging tickets to the event to be above the maximum number of males allowed in an event and if the number of females in the group does not cause the number of females pledging tickets to the event to be above the maximum number of females allowed in an event. Therefore, a group of males and females may be removed from the waitlist and purchase tickets to an event, if adding the group does not cause a number of males or females pledging to purchase tickets to the event to be greater than the maximum number of males or females allowed.

After waitlist module 175 has determined if the first group can be taken off the waitlist, waitlist module 175 may determine if the group with the next earliest timestamp can be taken off the waitlist. Waitlist module 175 may repeat this process until every group on the waitlist has been checked to see if they can be taken off of the waitlist, or until the event gets booked. This waitlist allows a group to not have to wait for sufficient spots to be available to pledge to purchase tickets to an event that they desire to attend. Instead, waitlist module 175 may automatically determine when there are sufficient spots open for the group in a fair way by taking a first come, first serve approach. Consequently, a group may pledge to purchase tickets to every event that the group is interested in.

Presentation module 176 may be configured to transmit information configured to be displayed on a graphical user interface of client computing device 120 and/or venue client computing device 140. In embodiments, presentation module 176 may transmit information associated with other users' profile information, event information, a number of other users pledging tickets to the event that the user has liked, a number of users pledging tickets to the event that have liked the user, a number of mutual interest connections a user has per upcoming event that has not been booked, etc.

In embodiments, if a user is an authorized member of a group, only the upcoming events with ticket prices that are less than or equal the amount of money that each and every authorized member of the group has allocated to spend on an event may be presented on client computing device 120. Therefore, if an event has a ticket price that is greater than an amount that any one authorized member of the group has allocated to spend for a ticket, the event may not be presented to any member of the group. Accordingly, only events with the ticket prices being within the price range of the lowest member of the group, may be presented to the group.

In other embodiments, presentation module 176 may present each pending events, regardless of the amount that any member of the group has allocated to spend for a ticket. Therefore, the members of the group may be presented with events that they may be more inclined to purchase tickets to, and thus the users may increase the amount that they have allocated to spend for a ticket. In such an embodiment, the crowd-funding server 110 may prevent a group from pledging an event that has a ticket price greater than the lowest amount allocated by any authorized member of the group.

Furthermore, the event information presented to the user may include an event's attributes, such as the name of the venue, the cost of a ticket to the event, the date of the event, the critical date that the event must be booked by, the location of the event, reviews that other users have given the venue, the number of males currently pledging to purchase a ticket to the event, the number of females currently pledging to purchase a ticket to the event, the male threshold for the event, the female threshold for the event, the male buffer zone, the female buffer zone, the user's number of mutual interest connections currently pledging to purchase a ticket to the event, a number of other users currently pledging to purchase a ticket to the event that the first user has liked, and/or a number of other users currently pledging tickets to the event that have liked the first user.

Client computing devices 120 may be a smart phone, tablet computer, laptop computer, wearable computer, personal data assistant, or any other type of mobile device with a hardware processor that is configured to process instructions and connect to network 130, one or more portions of network 130. Client computing devices 120 may include processing device 122, communication device 124, memory device 126, and user interface 128.

Processing device 122 may include memory, e.g., read only memory (ROM) and random access memory (RAM), storing processor-executable instructions and one or more processors that execute the processor-executable instructions. In embodiments where processing device 122 includes two or more processors, the processors may operate in a parallel or a distributed manner. Processing device 122 may execute an operating system of client computing device 120 or software associated with other elements of client computing device 120.

Communication device 124 may be a device that allows client computing device 120 to communicate with another device, e.g., crowd-funding server 110 over network 130. Communication device 124 may include one or more wireless transceivers for performing wireless communication and/or one or more communication ports for performing wired communication.

Memory device 126 may be a device configured to store data generated or received by client computing device 120. Memory device 126 may include, but is not limited to a hard disc drive, an optical disc drive, and/or a flash memory drive. Memory device 126 may be configured to store data associated with a user's profile on an online community, the events that a user has pledged to purchase tickets for, or any other information transmitted to or received from crowd-funding server 110.

User interface 128 may be a device that allows a user to interact with client computing device 110 or crowd-funding server 120 over network 130. While one user interface is shown, the term "user interface" may include, but is not limited to being, a touch screen, a physical keyboard, a mouse, a camera, a video camera, a microphone, and/or a speaker. Utilizing user interface 128, the user may pledge to purchase tickets for an event, send like information associated with a member of online community, join a group on the online community, view upcoming events, etc.

Venue computing devices 140 may be a smart phone, tablet computer, laptop computer, wearable computer, personal data assistant, or any other type of mobile device with a hardware processor that is configured to process instructions and connect to network 130, one or more portions of network 130. Venue computing devices 140 may include processing device 142, communication device 144, a memory device 146, and a user interface 148.

Processing device 142 may include memory, e.g., read only memory (ROM) and random access memory (RAM), storing processor-executable instructions and one or more processors that execute the processor-executable instructions. In embodiments where processing device 142 includes two or more processors, the processors may operate in a parallel or a distributed manner. Processing device 142 may execute an operating system of venue computing device 140 or software associated with other elements of venue computing device 140.

Communication device 144 may be a device that allows venue computing device 144 to communicate with another device, e.g., crowd-funding server 110 over network 130. Communication device 144 may include one or more wireless transceivers for performing wireless communication and/or one or more communication ports for performing wired communication.

Memory device 146 may be a device configured to store data generated or received by venue computing device 140. Memory device 146 may include, but is not limited to a hard disc drive, an optical disc drive, and/or a flash memory drive. Memory device 146 may be configured to store data associated with a an event such as the events attributes, venue size, how much money a venue desires or requires per event, or any other information transmitted to or received from crowd-funding server 110.

User interface 148 may be a device that allows a user to interact with venue computing device 140 or crowd-funding server 110 over network 130. While one user interface is shown, the term "user interface" may include, but is not limited to being, a touch screen, a physical keyboard, a mouse, a camera, a video camera, a microphone, and/or a speaker. Utilizing user interface 148, an associate may be able to view or modify attributes of an event, view how many users have pledged to purchase tickets to the event, etc.

Figure 2:
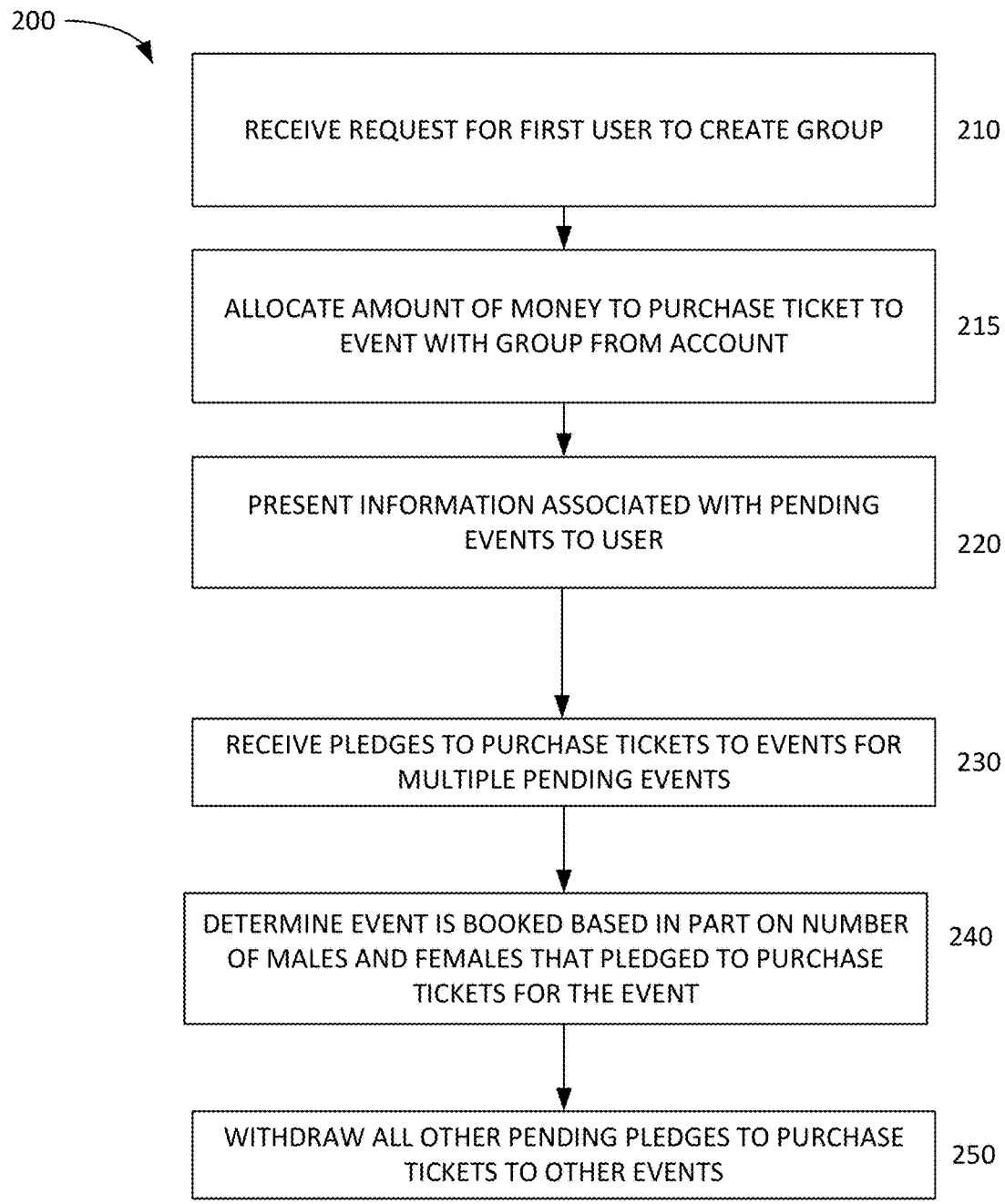
FIG. 2 depicts one embodiment of a method to book an event.

FIG. 2 illustrates a method 200 allowing users to book an event over a network. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 210, a request to create a group on an online community may be received. The request to create a group may be initiated by a single communication (e.g., a request) initiated by a first user requesting to create a group. The user may then invite others to join the group. To establish a group, a login identification and/or password for the group may be provided from the first user. For other users to join the group, the first user may transmit the login identification and/or the password for a group to the other users desiring to join the group, so that they can join by entering the login identification and/or password. In other embodiments, once a user has entered the correct login identification and/or password, a user that is already in the group or an administrator must approve the user in order for the user to join the group. Operation 210 may be performed by a group module that is the same as or similar to group module 171, in accordance with one or more implementations.

At operation 215, an allocated amount of money to purchase a ticket to an event from an account associated with the first user may be received. The first user may allocate an amount of money to purchase tickets to any event with an account associated with the established group wherein the money allocated to the established group may be money that has not been allocated to another group. Because the first user may only allocate money to the group from his account that has not been allocated to any other group, the first user can pledge to purchase tickets with multiple groups without exceeding the total amount of money in the account. Therefore, if the group pledges a successful event and the pledged funds are taken out of the user's account, the user is still guaranteed to have sufficient funds in his or her account to pay for his or her other groups in case those groups end up booking an event as well. In other embodiments, a user can be charged a separate pending charge for each group that he or she is in, or could have a valid credit/debit card on file ready to be charged. Operation 215 may be performed by a profile module that is the same as or similar to profile module 168, in accordance with one or more implementations.

At operation 220, information associated with pending events may be presented to the first user. In embodiments, information associated with the pending events with a ticket price being less than or equal to the lowest amount that any authorized member of a group that the first user is associated with may be presented to the first user. As such, the first user may not be able to view pending events that have a ticket price higher than the lowest amount of money that any authorized group member desires to spend. However, in other embodiments, information associated with each pending event may be presented to the first user, regardless of the ticket price. In these embodiments, the crowd-funding server may prevent the group from pledging an event with a ticket price greater than the lowest amount of money allocated by an authorized user to the group. The information associated with an event presented to the user may include the events attributes, such as the name of the venue, the cost of a ticket to the event, the date of the event, the critical date the event must be booked by, the location of the event, reviews that have been given to the venue in the past, the number of males that have currently pledged to purchase a ticket to the event, the number of females that have currently pledged to purchase a ticket to the event, the male threshold for the event, the female threshold for the event, the male buffer zone, the female buffer zone, the number of mutual interest connections the user currently has that have currently pledged to purchase a ticket to the event, a number of users at an event that the first user has liked, a number of other users that have liked the first user, etc. Operation 220 may be performed by a presentation module that is the same as or similar to presentation module 176, in accordance with one or more implementations.

At operation 230, information indicating that the first user desires to pledge to purchase tickets to an event may be received. Responsive to receiving the information that the first user desires to pledge to purchase tickets to an event, each authorized member of a group that is associated with the first user may also automatically pledge to purchase a ticket for the event. In embodiments, at operation 230, the first user may pledge to purchase tickets to multiple events, thus each authorized member of the groups that the first user is associated with may also automatically pledge to purchase tickets to multiple events based on the first user's actions. In further embodiments, only the first user or any administrator of the group may be allowed to pledge to purchase tickets to the event for the group. Operation 230 may be performed by a pledge module that is the same as or similar to pledge module 174, in accordance with one or more implementations.

At operation 240, based on the first user's group pledging to purchase tickets to an event, it may be determined that the event has a number of males being greater than or equal to the male threshold and a number of females being greater than or equal to the female threshold. In such case, the event may be automatically booked. Responsive to the even being booked, each user that pledged to purchase tickets to the event may automatically purchase the ticket to the event. Operation 240 may be performed by an event module that is the same as or similar to event module 172, in accordance with one or more implementations.

At operation 250, responsive to the event being booked at operation 240, all of the other pledges to purchase tickets to other events associated with the group that the first user is a member of may be deleted. Operation 250 may be performed by an event module that is the same as or similar to event module 172, in accordance with one or more implementations.

Figure 3:
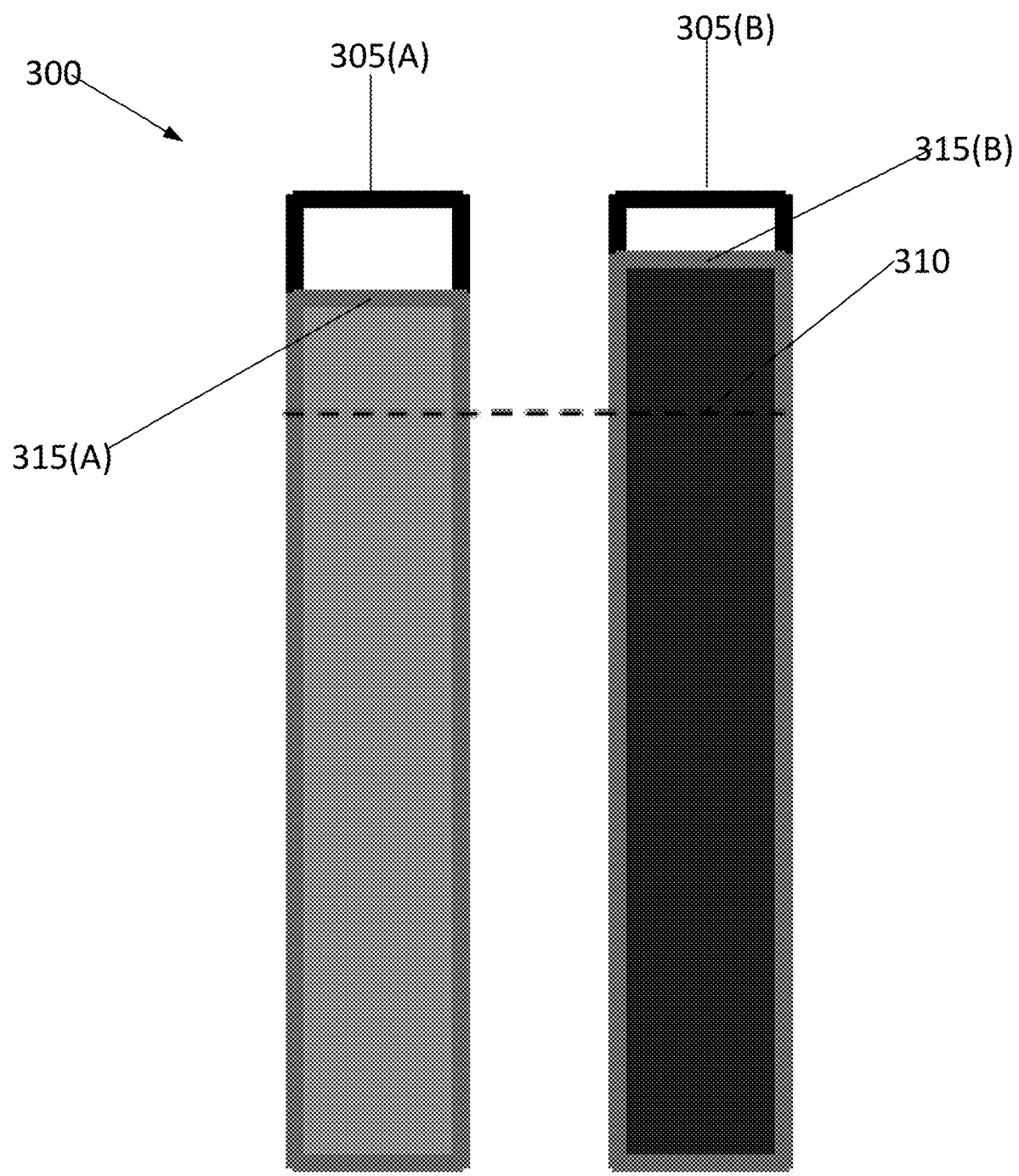
FIG. 3 depicts one embodiment of metrics associated with an event.

FIG. 3 depicts one embodiment of data associated with an event 300. Event 300 may have a maximum capacity associated with males 305(A) and a maximum capacity associated with females 305(B), wherein the maximum capacities may indicate the maximum number of individuals in the subgrouping that may attend event 300. In this embodiment, the maximum capacity associated with males 305(A) and females 305(B) may be the same, which may be two hundred individuals per subgroup.

Event 300 may also include thresholds 310 associated with the number of males and/or females required for an event to become funded. In embodiments, thresholds 310 may be the same or different value for each subgrouping, which in this example embodiment may be one hundred fifty individuals per subgroup. Responsive to event 300 having more than one hundred fifty individuals per subgroup, the event may be funded and booked.

Depicted in FIG. 3, the number of males currently in the male subgroup is one hundred eighty nine, and the number of females currently in the female subgroup is 194. Accordingly, both the number of males and females is currently above the corresponding threshold 310, indicating event 300 is a funded event.

Figure 4:
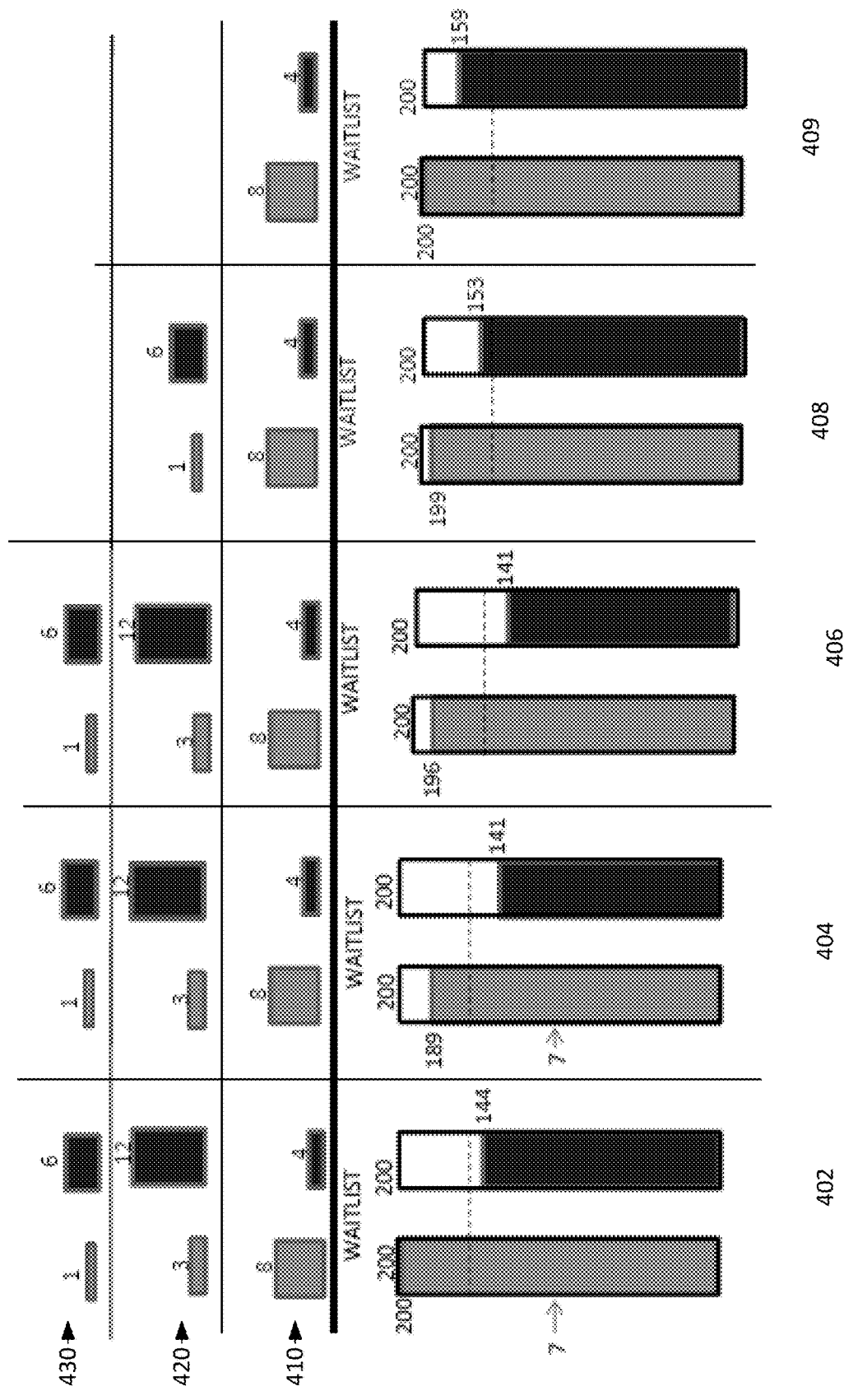
FIG. 4 depicts one embodiment of metrics associated with an event and groups at different periods of time.

FIG. 4 depicts one embodiment of a table of three groups 410, 420, and 430, wherein each group has pledged to purchase tickets to an event 400 at different points in time. A first group 410 includes eight male and four females, and the first group 410 may have pledged to purchase tickets for event 400 at a first time. A second group 420 includes three males and twelve females, and the second group 420 may have pledged to purchase tickets to event 400 at a second time. A third group 430 includes one male and six females, and the third group 430 may have pledged to purchase tickets to event 400 at a third time. In the embodiment depicted in FIG. 4, the first time is before the second time, and the second time is before the third time. Additionally, there are seven individuals on an individual user waitlist, wherein the seven individuals are authorized members of groups that have already pledged to purchase tickets to the event.

FIG. 4 also includes a fourth period of time 402, a fifth period of time 404, a sixth period of time 406, a seventh period of time 408, and a ninth period of time 409.

In the fourth period of time 402, event 400 is not booked because at least one of the subgroups (males and females)

has not reached a corresponding threshold for event 400. Specifically, the number of females pledging to purchase tickets to the event is currently set at one hundred and forty-four, while the female threshold is set at one hundred and fifty. Furthermore, the number of males pledging to purchase to event 400 is currently at two hundred males, while the maximum allotment for males at the event 400 is set at two hundred. Therefore, if any of groups 410, 420, 430 were to purchase tickets to the event, or if any of the males trying to join groups already on the event's list were to purchase tickets to the event, the number of males pledging to purchase tickets to the event 400 would go over the maximum allotment due to the number of males in each group 410, 420, and 430 and the maximum allotment for event 400. Thus, groups 410, 420, and 430, as well as the 7 individuals, remain on the waitlist, and event 400 remains un-booked.

At the fifth period of time 404, an unrelated second event may be booked. Responsive to the second event being booked, at least one group that had previously pledged to purchase tickets to event 400, but are now going to the second event, may be removed from the list of groups pledging to purchase tickets to event 400. Accordingly, the number of males and females pledging to purchase tickets to event 400 may change based on the second event being booked. At the fifth period of time 404, the number of males pledging to purchase tickets to event 400 has decreased to one hundred eighty-nine, and the number of female pledging to purchase tickets to event 400 has decreased to one hundred forty-one.

At the sixth period of time 406, any of the waitlisted groups could have been removed from the waitlist and automatically pledge to purchase tickets to the event, but priority in this embodiment is given to individuals desiring to join groups that are already on the list. Accordingly, in this embodiment, seven males on the individual waitlist associated with groups that are already on the list may be removed from the individual waitlist associated with groups already on the event's list. This raises the number of males pledging to purchase tickets to the event to one hundred ninety-six. In other embodiments, individuals trying to join a group already on the list are not given priority over groups, and instead solely depend on the timestamp of the group they are trying to join, or in other embodiments depend on the timestamp of when they joined the waitlist.

At the seventh period of time 408, the crowd funding server may determine which group may pledge to purchase tickets to event 400 based on 1) the number of males and females within the group, 2) the maximum number of males and females allowed at event 400, and 3) the timestamp when the group pledged to purchase tickets to event 400.

At the seventh period of time 408, the first group 410 may not be allowed to pledge to purchase tickets to event 400 because the number of males in first group 410 would cause the number of males pledging to purchase tickets to event 400 to go over the maximum allotment of males at event 400. Accordingly, at the seventh period of time 408 second group 420 would be allowed to pledge to purchase tickets to event 400 because the number of males and females within second group 420 would not cause maximum number of males or females pledging to purchase tickets to event 400 to be over a respective maximum allotment.

At the seventh period of time 408, responsive to second group 404 being allowed to pledge to purchase tickets to event 400, event 400 may be booked because the number of males and females pledging to purchase tickets to event 400 is over their respective thresholds. Responsive to the second group 404 pledging to purchase tickets to the event, all the other pledges that any group now going to this event has made to other events may be automatically deleted.

At the ninth period of time 409, despite event 400 being booked, there is still room for the third group 430. Therefore, the server may automatically take group 430 off of the waitlist, and automatically purchase tickets to the event, as they will not cause the number of males or females going to the event to be above their respective maximums.

Figure 5:
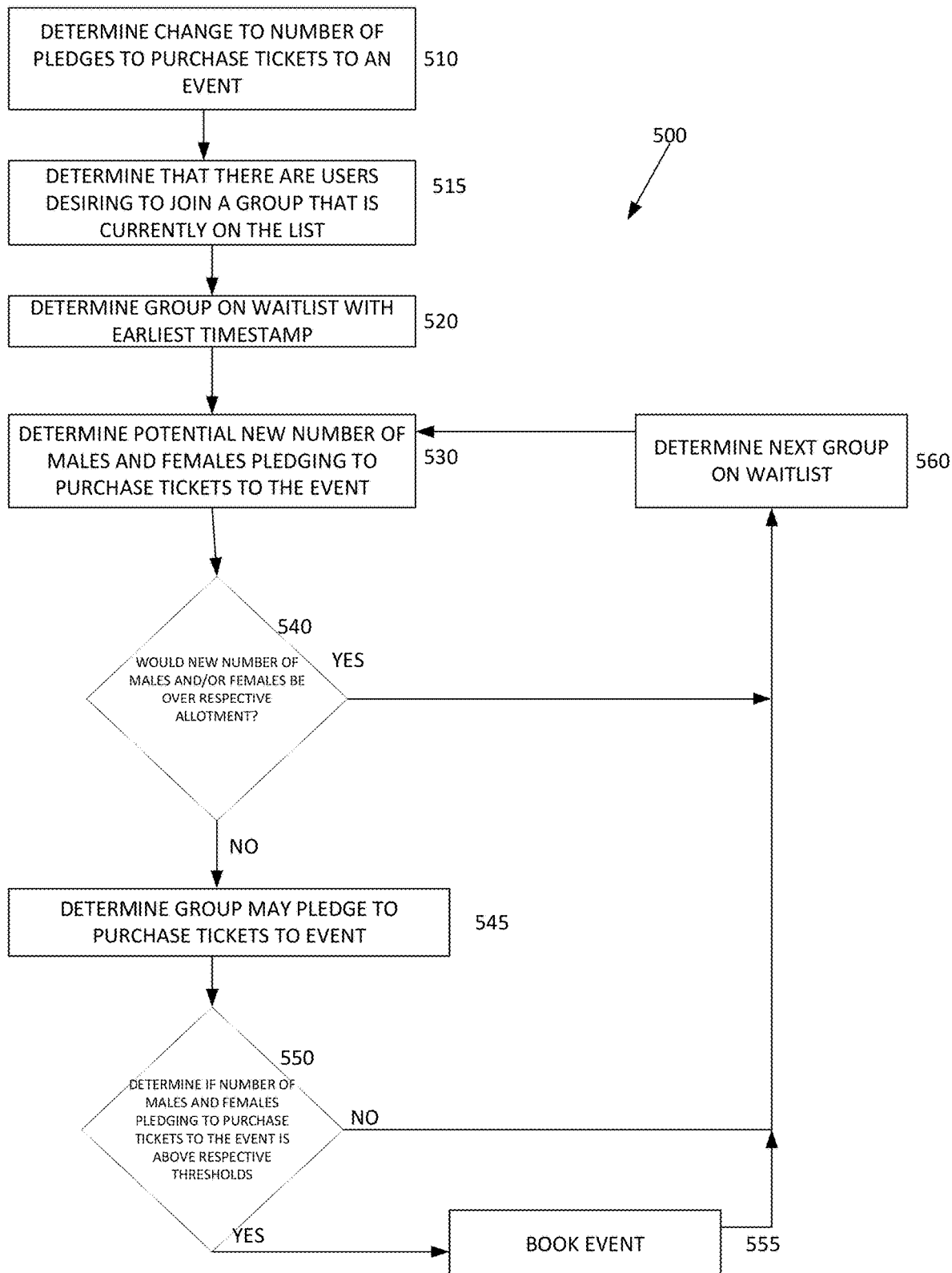
FIG. 5 depicts one embodiment of a method of managing a waitlist for an event.

FIG. 5 illustrates a method 500 illustrating what happens if the number of pledges to purchase tickets to an event changes. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At operation 510, the number of pledges to purchase tickets to an event changes. This could be initiated by the crowd-funding server when automatically deleting pledge(s) to purchase tickets due to other events being booked, by a group deleting their pledge to purchase tickets, by a user leaving a group, a user selling their ticket, etc. Operation 510 may be performed by an event module that is the same as or similar to event module 172, in accordance with one or more implementations.

At operation 515, the crowd-funding server may determine that there are individual users trying to join a group that is currently on the list; however, at the time these users joined their respective groups there was no room for the user's sex at this event. The crowd-funding server may sort these individuals first by the timestamp that the group pledged to purchase tickets to the event, and second by the time the users joined the group. If there are any of these waitlisted individuals, and if the spots that have opened up are of their respective sex, then the crowdfunding system puts as many of them on the list for the event as possible without exceeding the maximum male or maximum female count. In other embodiments, the crowd-funding server may not give priority to these individuals, and instead treats them as if they were their own group, and may or may not let these individual users use the timestamp of the group they are trying to join. Operation 515 may be performed by an event module that is the same as or similar to event module 172, in accordance with one or more implementations.

At operation 520, the crowd-funding server may determine that the number of males and females in the group on the waitlist with the earliest timestamp to pledge to purchase tickets to an event. When determining the number of males and females in the group on the waitlist with the earliest time stamp to pledge to purchase tickets to the event, the crowd-funding server may only count the users that are authorized to be in the waitlisted group. In embodiments, a group may be comprised of a single user or multiple users. Operation 520 may be performed by an event module that is the same as or similar to event module 172, in accordance with one or more implementations.

At operation 530, the crowd-funding server may determine a potential new number of males and females pledging to purchase tickets to the event if the number of authorized males in the group and authorized females in the group requesting to pledge to purchase tickets to the event is added to the number of males and females, respectively, that are currently pledging to purchase tickets to the event. The crowd-funding server may not count a user with the same user identification twice by subtracting out duplicate pledges to purchase tickets that have the same user identification. For instance, if a user is in two groups and both groups have pledged to purchase tickets to a same event, the crowd-funding server may only count the user who is in both groups once. Operation 530 may be performed by an event module that is the same as or similar to event module 172, in accordance with one or more implementations.

At operation 540, the crowd-funding server may determine if the potential new number of males or females is greater than the event's maximum number of males or females, respectively. Operation 540 may be performed by an event module that is the same as or similar to event module 172, in accordance with one or more implementations.

At operation 545, responsive to determining that adding the group would not cause the number of males or females to go over the maximum number of males and females allowed at an event, respectively, at operation 540, then the group may be taken off the waitlist and the group may automatically pledge to purchase tickets to the event. Operation 545 may be performed by an event module that is the same as or similar to event module 172, in accordance with one or more implementations.

At operation 550, the crowd-funding server may determine if the new number of males and females that have pledged to purchase tickets to the event is greater than or equal to the male threshold and female threshold, respectively. If both are not greater than or equal to their respective threshold, then method 500 may continue to operation 560. If both are greater than or equal to their respective threshold, method 500 may continue to operation 555. Operation 550 may be performed by an event module that is the same as or similar to event module 172, in accordance with one or more implementations.

At operation 555, if both the new number of males and females that have pledged to purchase tickets to the event are greater than or equal to their respective threshold, then the event may be booked. Responsive to the event being booked, all the other pledges that any group now going to this event has made to other events may be automatically deleted, and the ticket price may be withdrawn from each authorized user's accounts. Any unused funds that were allocated to the group may be returned to the user's account and can be allocated to other groups. In other embodiments, a pending charge that was required to pledge events may be actually charged, or a valid credit/debit card could be charged. Then method 500 may continue to method 560. Operation 555 may be performed by an event module that is the same as or similar to event module 172, in accordance with one or more implementations.

Returning to operation 550, responsive to determining that adding the group would cause the number of males or females to go over the maximum number of males and females allowed at an event, respectively, then the group may not be taken off the waitlist, and method 500 may continue to operation 560. At operation 560 the crowd-funding server may determine the number of males and females in the group with the next earliest timestamp on the waitlist to pledge to purchase tickets to the event. If there are no more groups on the waitlist, then method 500 may end. If there are additional groups on the waitlist, then method 500 may continue to operation 530, where a potential new number of males and females pledging to purchase tickets to the event may be determined. Operation 550 may be performed by an event module that is the same as or similar to event module 172, in accordance with one or more implementations.

Figure 6:
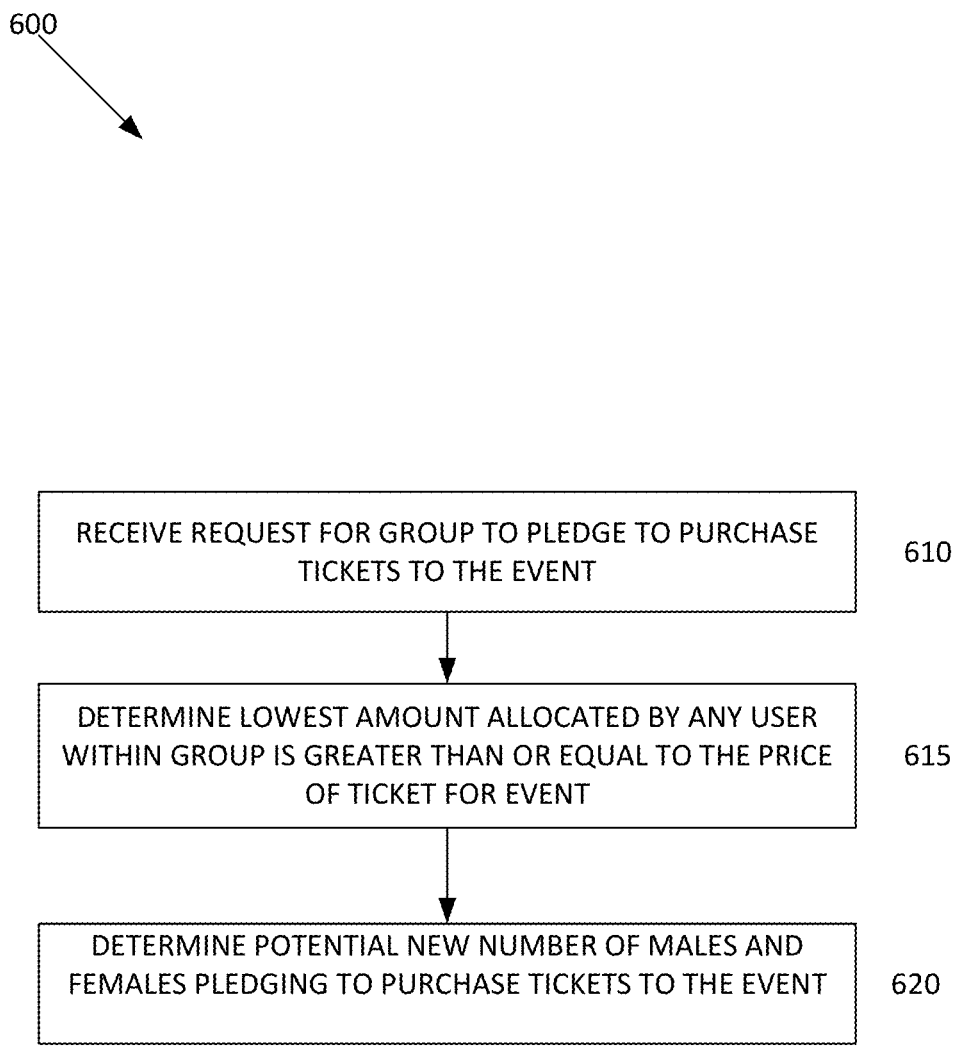
FIG. 6 depicts one embodiment of a method of managing a group of users.

FIG. 6 illustrates a method 600 of a group pledging to purchase tickets to an event. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At operation 610, information indicating that the first user desires to pledge to purchase tickets to an event may be received. Responsive to receiving the information that the first user desires to pledge to purchase tickets to an event, each authorized member of a group that is associated with the first user may also automatically pledge to purchase a ticket for the event. In embodiments, at operation 410, the first user may pledge to purchase tickets to multiple events, thus each authorized member of the group that the first user is associated with may also automatically pledge to purchase tickets to multiple events based on the first user's actions. In further embodiments, only the first user and/or any administrator of the group may be allowed to pledge to purchase tickets to the event for the group. Operation 610 may be performed by a pledge module that is the same as or similar to pledge module 174, in accordance with one or more implementations.

At operation 615, the crowd-funding server may compare the lowest amount of money that an authorized user within the group has allocated to the group to the price of the ticket pledged to purchase in operation 610. If the amount of allocated money associated with any member within the group is lower than the ticket price of the event, the group's pledge to purchase tickets to the event may be denied. In other embodiments, the group may be placed on a waitlist. In other embodiments, only the individuals that have not allocated enough funds to the group may be placed on a waitlist. If the lowest amount of allocated money associated with any member within the group is found to be greater than or equal to the ticket price, method 600 may continue to operation 620. In other embodiments, only events with a ticket price being less than or equal to the lowest amount of money allocated by any member of the group may be presented to the first user. Therefore, any user within a group may not be able to pledge to purchase tickets that are greater than the lowest amount of money allocated by any member of the group. Operation 615 may be performed by a pledge module that is the same as or similar to pledge module 174, in accordance with one or more implementations.

At operation 620, the crowd-funding server may add the number of authorized males in the group and authorized females in the group requesting to pledge tickets to the number to the number of males and females that have already pledged to purchase tickets to an event, respectively. The crowd-funding server may not count a user with the same user identification twice by subtracting out duplicate pledges to purchase tickets that have same user identification. For instance, if a user is in two groups and both groups have pledged to purchase tickets to a same event, the server will only count the user who is in both parties once. Operation 620 may be performed by an event module that is the same as or similar to event module 172, in accordance with one or more implementations.

Figure 7:
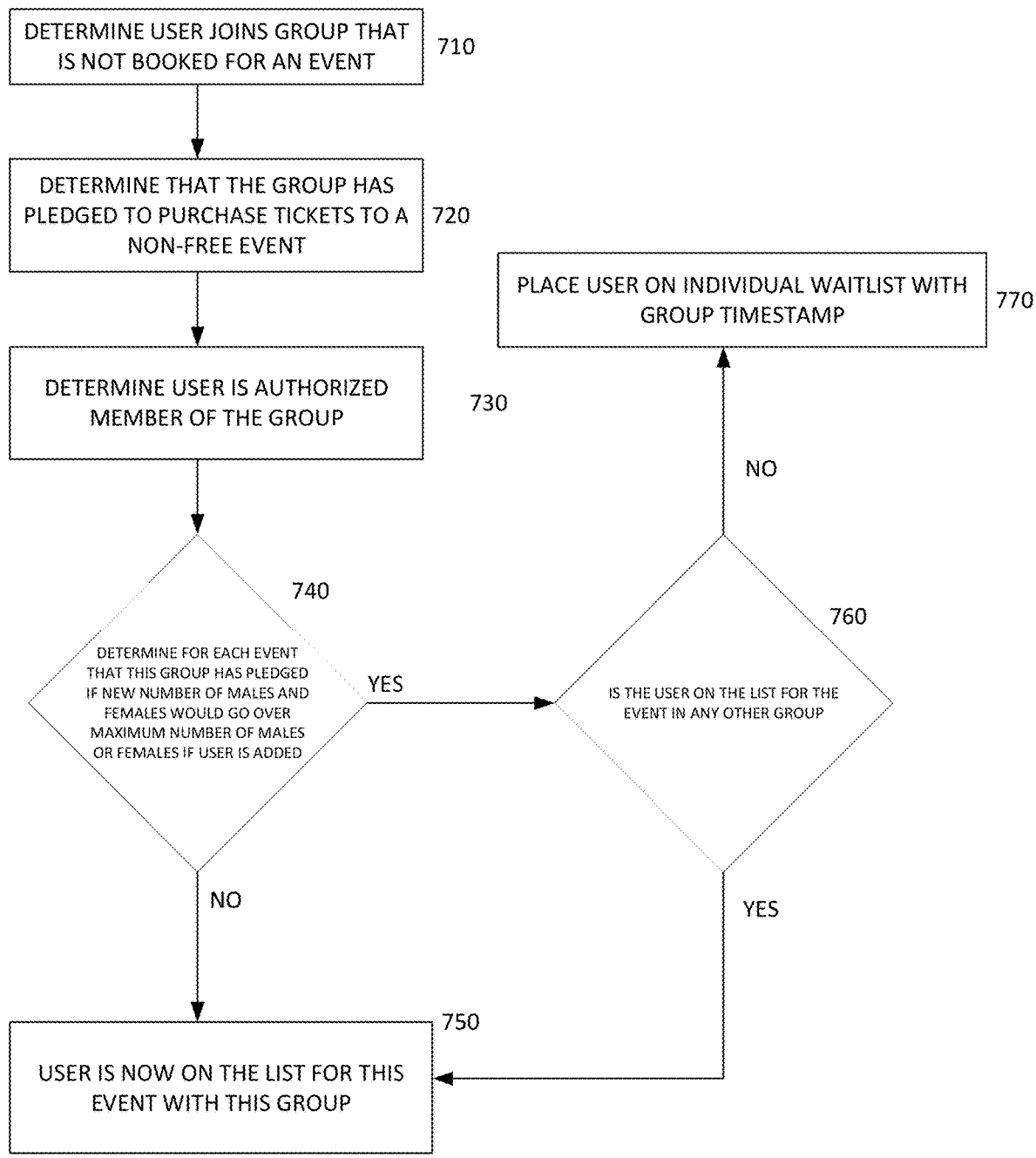
FIG. 7 depicts one embodiment of a method of managing a group of users.

FIG. 7 depicts a method 700 of a user becoming an authorized member of an existing group that has not yet purchased tickets to an event. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At operation 710, a user may transmit a request to join a group, wherein the group may not have purchased tickets to an event at a given time. To join the group, the user may supply login identification, such as a group name and/or a password, to the crowd-funding server in order to join a group. The crowd-funding server may determine whether or not the login identification exists and/or whether the login identification and password combination is correct. If it is not, the user may be denied access to join the group. If it is, then the user may join the group. Operation 710 may be performed by a group module that is the same as or similar to group module 171, in accordance with one or more implementations.

At operation 720, the crowd-funding server may determine that the group that the user has just joined has pledged to purchase tickets to non-free or negatively priced events. If the group has not pledged to purchase tickets to any positively priced events, then the user may automatically become an authorized member of the group. Responsive to determining that the group has pledged to purchase tickets to at least one positively priced event, then the user may automatically become an unauthorized member of the group.

At operation 730, it may be determined that the user is an authorized member of the group. An unauthorized member may become an authorized member only if the user allocates enough money to the group to cover the most expensive pledge to purchase tickets to an event that the group has pledged. If a group pledges to purchase tickets to a successful event, only the authorized members of the group may be charged and only the authorized members may be allowed to go to the event. Accordingly, to determine if the user is an authorized member of the group, the amount of money that the user allocated to the group may be determined. The user may only allocate money from the user's account that has not been allocated to any other group. This may ensure that the user has sufficient funds to fund every group the user is in. In other embodiments, the user's credit/debit card could be charged a pending charge for this group. The crowd-funding server may determine whether or not the user has allocated an amount of money greater than or equal to the most expensive pledge to purchase tickets to an event that the group has pledged. If the user has allocated an amount of money greater than or equal to the most expensive pledge to purchase tickets to an event that the group has pledged, then the user may become an authorized member of the group. If the user has allocated an amount of money less than the most expensive pledge to purchase tickets to an event that the group has pledged, then the user may remain an unauthorized member of the group. In other embodiments, the user may still become an authorized member of the group, but is put on the individual waitlist for each event that has a ticket price that is greater than the amount the user has allocated to the group. The user can be taken off the waitlist once the user allocates enough money to the group to cover the ticket price (and there is enough room to let the user in), or if the ticket price drops, perhaps due to a sponsorship, below or equal to the amount the user allocated to the group. Operation 730 may be performed by a group module that is the same as or similar to group module 171, in accordance with one or more implementations.

At operation 740, for each of the events that the group has signed up to pledge to purchase tickets for, it may be determined if by adding the user would the potential new number of males or females associated with the event be greater than the maximum number of males or females allowed at the event, respectively. Operation 740 may be performed by an event module that is the same as or similar to event module 172, in accordance with one or more implementations.

At operation 750, responsive to determining at operation 740 that the potentially new number of males and females associated with the event caused by adding the user to the event's list with this group will not be greater than the maximum number of males and females allowed at the event, the user may pledge to purchase tickets to the event. Operation 750 may be performed by an event module that is the same as or similar to event module 172, in accordance with one or more implementations.

At operation 760, responsive to determining at operation 740 that the potentially new number of males or females associated with the event caused by adding the user to the event's list with this group will be greater than the maximum number of males or females allowed at the event respectively, it may be determined if the user is currently pledging to purchase tickets to the same event via another group. If the user is on the list to pledge to purchase tickets to the event via another group, the method may continue to operation 750, wherein the user may automatically pledge to purchase tickets to the event. Operation 760 may be performed by an event module that is the same as or similar to event module 172, in accordance with one or more implementations.

At operation 770, responsive to determining that the user is not on the list to pledge to purchase tickets to the event via another group, the individual user may be put on the individual waitlist for the event. The individual user may be given a timestamp associated with when the group pledged to purchase tickets to the event. In other embodiments, the individual user may instead be given a timestamp associated with when the user was placed on the waitlist. The user will not attend the event with the group until enough spots on this list open up to allow the user to join. In embodiments, the user may be able to delete the group's pledge to purchase tickets to the event in order to ensure that there is no chance of the group going to an event without him or her. In other embodiments, the crowdfunding system may instead automatically put the entire group on the waitlist for the event when a user joins and causes the event's number of males or females to exceed the event's maximum number of males or females respectively. Operation 770 may be performed by an event module that is the same as or similar to event module 172, in accordance with one or more implementations.

Figure 8:
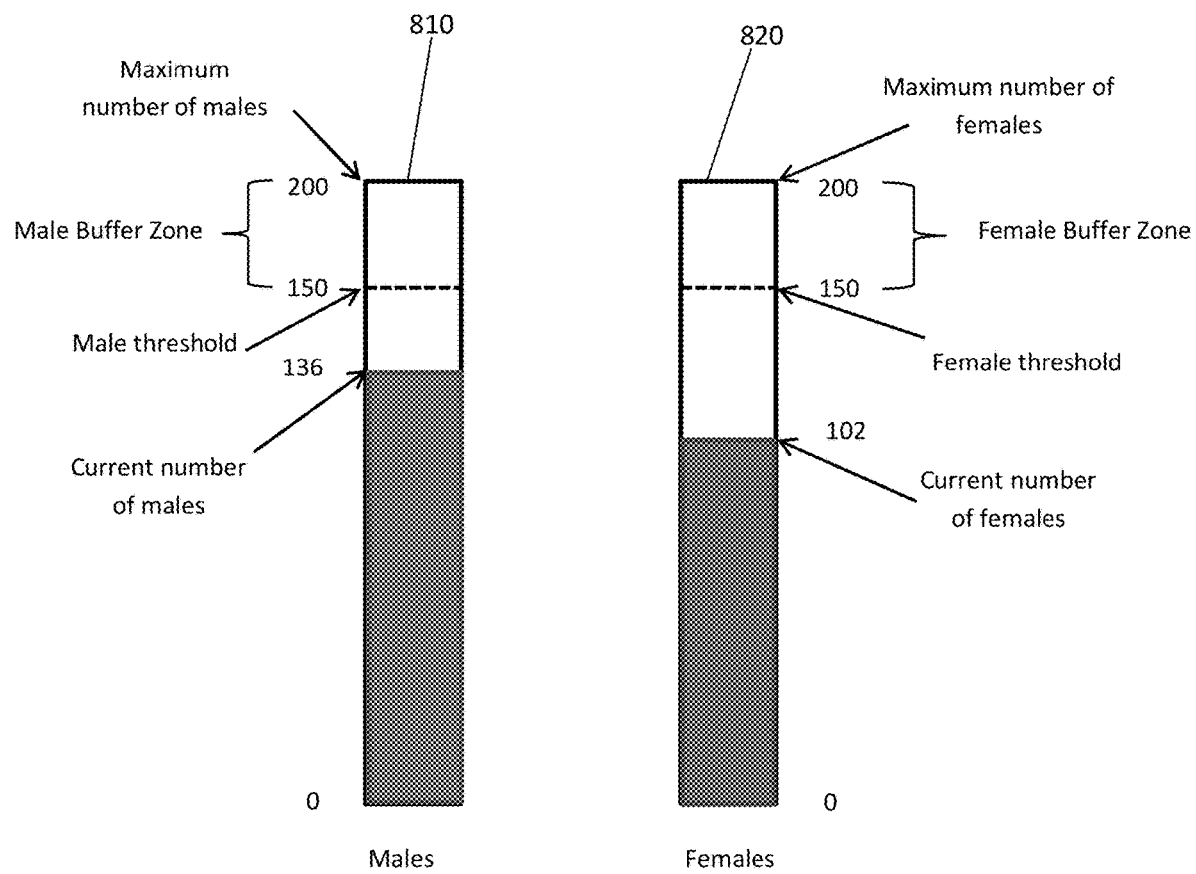
FIG. 8 depicts one embodiment of metrics associated with an event.

FIG. 8 depicts one pictorial embodiment of metrics 810 associated with males desiring to attend an event, and metrics 820 associated with females desiring to attend the event. Furthermore, FIG. 8 depicts male and female thresholds, the male and female buffer zones, and the maximum number of males and females allowed at an event.

As depicted in FIG. 8, the maximum number of males is two hundred and the maximum number of females is two hundred. It is to be understood that the maximum number of males is not required to be equal to the maximum number of females. Further, as depicted in FIG. 8, the male threshold is one hundred fifty and the female threshold is one hundred fifty. It is to be understood that the male threshold is not required to equal the female threshold. The male threshold may be always less than or equal to the maximum number of males allowed at an event, and the female threshold may be always less than or equal to the maximum number of females allowed at an event.

The amount of tickets between the maximum number of males and females allowed at an event and the male and female thresholds are the male and female buffer zones, respectively. Once the number of males and females is within the male and female buffer zones, respectively, the event may be automatically booked. In other words, if the number of males and females is greater than or equal to the male and female thresholds, respectively, and below or equal to the maximum number of males and females allowed at an event, respectively, the event may be automatically booked.

The male and female thresholds can equal the maximum number of males and females allowed at an event, respectively. In such an embodiment, the event may be automatically booked once the number of males and females equals the maximum number of males and females allowed at an event respectively. In this pictorial embodiment, the current number of males that have pledged this event equals one hundred thirty six, and the current number of females that have pledged this event equals one hundred two. Consequently, the event has not yet been booked, as the number of males and females are not greater than or equal to the male and female thresholds respectively.

Figure 9:
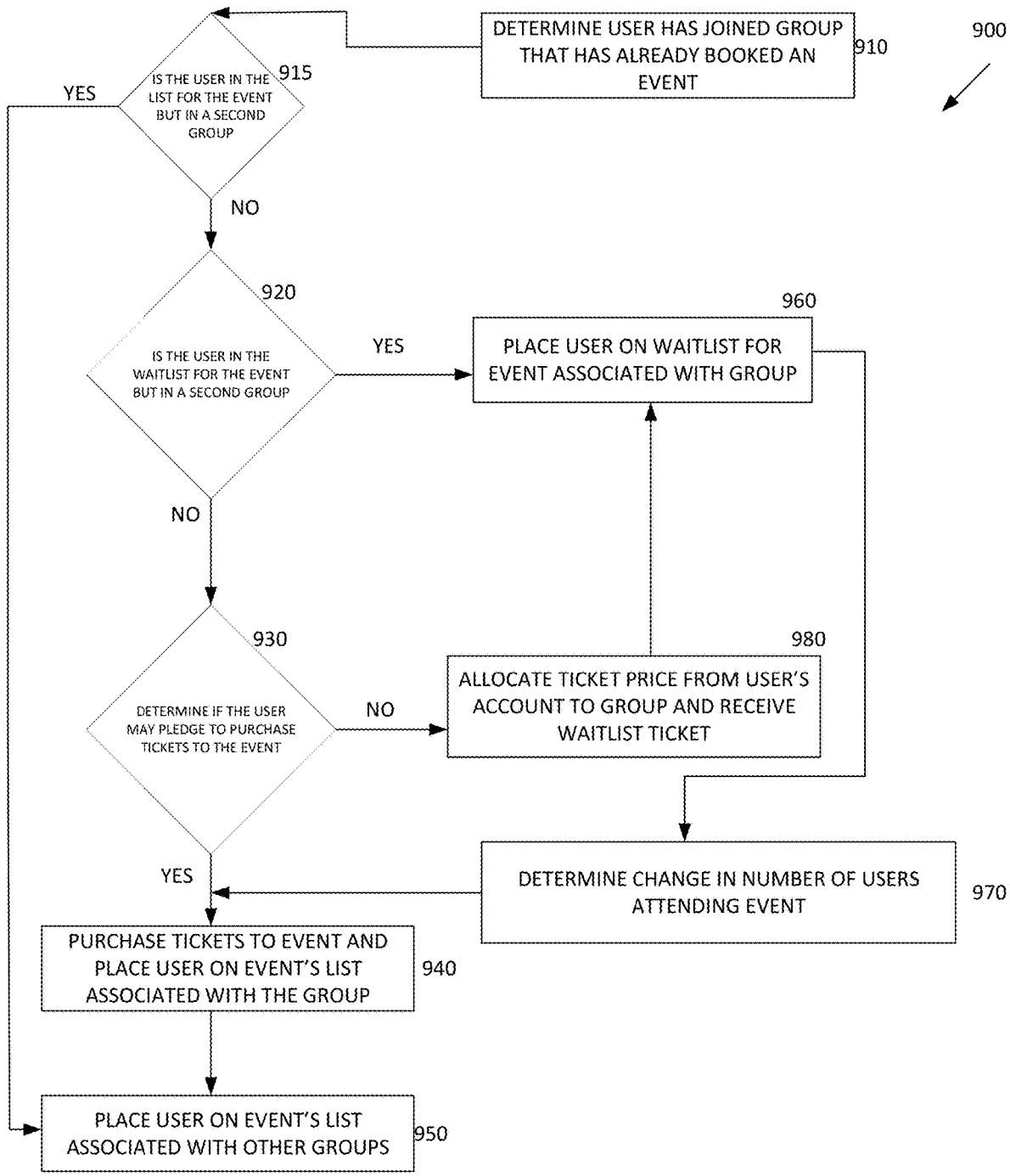
FIG. 9 depicts one embodiment of a method of booking an event.

FIG. 9 depicts a method 900 of a user become a member of a group that has booked an event. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting.

In some embodiments, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At operation 910, a user may transmit a request to join a group, wherein the group may have already purchased tickets to an event. Operation 910 may be performed by a group module that is the same as or similar to group module 171, in accordance with one or more implementations.

At operation 915, it may be determined if the user is currently on the event's list but via a different group. If it is determined that this user is currently on the event's list, then the process may proceed to operation 950, and be placed on the event's list with this group as well. Operation 915 may be performed by an event module that is the same as or similar to event module 172, in accordance with one or more implementations.

At operation 920, it may be determined if the user is currently in the waitlist for the event but in a second group. The determination may be based on comparing the user identification associated with the user with user identifications on a waitlist for the event. Operation 920 may be performed by an event module that is the same as or similar to event module 172, in accordance with one or more implementations.

At operation 930, responsive to determining that the user is not on the waitlist for the event in a second group, it may be determined if adding the user to the group would cause the number of males or females purchasing tickets to the event to be greater than the maximum number of males or females allowed at the event, respectively. Operation 930 may be performed by an event module that is the same as or similar to event module 172, in accordance with one or more implementations.

At operation 940, responsive to determining that adding the user to the group would not cause the number of males or females attending the event to be greater than the maximum number of males or females allowed at the event, respectively, the user may purchase a ticket to the event and be put on the event's list with the group. Operation 940 may be performed by an event module that is the same as or similar to event module 172, in accordance with one or more implementations.

At operation 950, if the user is currently an unauthorized member in any other groups that are also going to the event, the user may become authorized members of those groups as well, and be placed onto the event's list with these other groups. Operation 950 may be performed by an event module that is the same as or similar to event module 172, in accordance with one or more implementations.

Returning to operation 920, responsive to determining that the user is on the waitlist for the event in a second group, at operation 960 the user may be placed on the waitlist with the timestamp associated with the group, and the user may remain on the waitlist with a timestamp associated with the second group. Therefore, the user may have two timestamps associated with the event, wherein the timestamps are associated with the time the different groups pledged to purchase tickets to the event. In other embodiments, the user may not be given the timestamp of the group, but instead given a timestamp associated with when the user was placed on the waitlist. Operation 960 may be performed by a group module that is the same as or similar to group module 171, in accordance with one or more implementations.

At operation 970, the number of users attending the event may change after the members of a group have already purchased the tickets. Individuals that cannot attend the event may put their ticket up for sale in hopes of transferring their ticket(s) to another user trying to go to the same event. Because a ticket is associated with a user identification, a user may not be able to sell their ticket outside of the crowdfunding system for a premium, a practice known as 'scalping'. Users may be forced to use the crowdfunding system to sell their tickets for the current ticket price if they cannot go. In embodiments, at operation 970 the number of users attending the event may change to be lower than the maximum, which may allow the waitlisted user to automatically purchase tickets to the event. Operation 970 may be performed by an event module that is the same as or similar to event module 172, in accordance with one or more implementations.

Returning to operation 930, responsive to determining that adding the user to the group would cause the number of males or females purchasing tickets to the event to be greater than the maximum number of males or females allowed at the event, at operation 980 the user may allocate an amount of money equal to the ticket price from the user's account to the group, and the user may be placed on the waitlist for the event. If the ticket price decreases due to a sponsorship, the server may automatically change the amount of money that this user has devoted to the group to the new ticket price, and either place the difference between the old and new price into the users account or refund it to the users credit/debit card. Operation 980 may be performed by an event module that is the same as or similar to event module 172, in accordance with one or more implementations.

Figure 10:
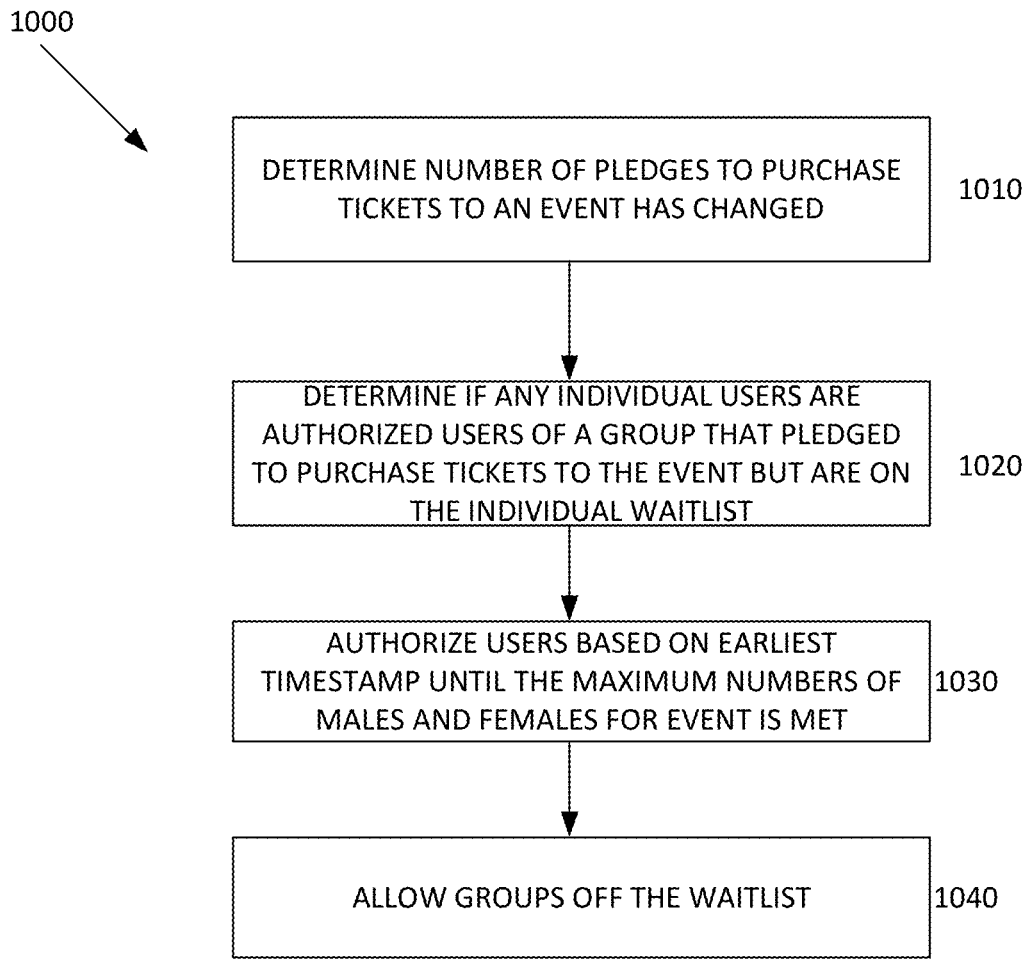
FIG. 10 depicts one embodiment of a method of booking an event.

FIG. 10 depicts a method 1000 of managing an event's waitlist based on the number of users pledging to purchase tickets to the event changing. The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 10 and described below is not intended to be limiting.

In some embodiments, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At operation 1010, the number of pledges to purchase tickets to a first event may decrease. The number of pledges to purchase tickets to the first event may decrease responsive to pledges getting automatically deleted upon a second event being booked, a group or a user deleting their pledge to purchase tickets to the event, a user attempting to sell their ticket as they can no longer attend the event, a user leaving a group, etc. Operation 1010 may be performed by an event module that is the same as or similar to event module 172, in accordance with one or more implementations.

At operation 1020, it may be determined that a first user is an authorized member of a group that is on the event's list, but the first user is individually on the waitlist. The first user may first be given the same timestamp for the event as when the group pledged to purchase tickets to the event and a second timestamp of when the first user became an authorized user of the group. Accordingly, the system may give priority to users trying to attend an event with a group that is on the list and has an earlier timestamp. If two users are trying to go to the event with the same group, then priority is given to the user who became an authorized member of the group the earliest. In other embodiments, individuals may not be given priority over waitlisted groups, and instead compete with them over who has the earliest timestamp, which may be associated with that of when the group pledged to purchase tickets to the event, or in other embodiments with that of when the user joined the waitlist. Operation 1020 may be performed by a group module that is the same as or similar to group module 171, in accordance with one or more implementations.

At operation 1030, as many users on the individual waitlist may be authorized to pledge to purchase tickets to the event as possible without letting the number of users pledging to purchase tickets to the event exceed either the event's maximum number of males or females. In embodiments, individual users trying to join a group that is already on the list may be given priority over waitlisted groups. Therefore, a user may have a greater chance of attending the event if the user joins a group that has already pledged to purchase tickets to the event, versus being in a waitlisted group. In other embodiments, these individual users may not be given priority over waitlisted groups, and may or may not use the timestamp of when the group pledged to purchase tickets to the event. Operation 1030 may be performed by an event module that is the same as or similar to event module 172, in accordance with one or more implementations.

In operation 1040, as many groups on the waitlist may be authorized to pledge to purchase tickets to the event as possible without letting the number of users pledging to purchase tickets to the event exceed either the event's maximum number of males or females. Priority is given to groups with the earliest timestamp of when the group pledged to purchase tickets. Operation 1040 may be performed by an event module that is the same as or similar to event module 172, in accordance with one or more implementations.

Figure 11:
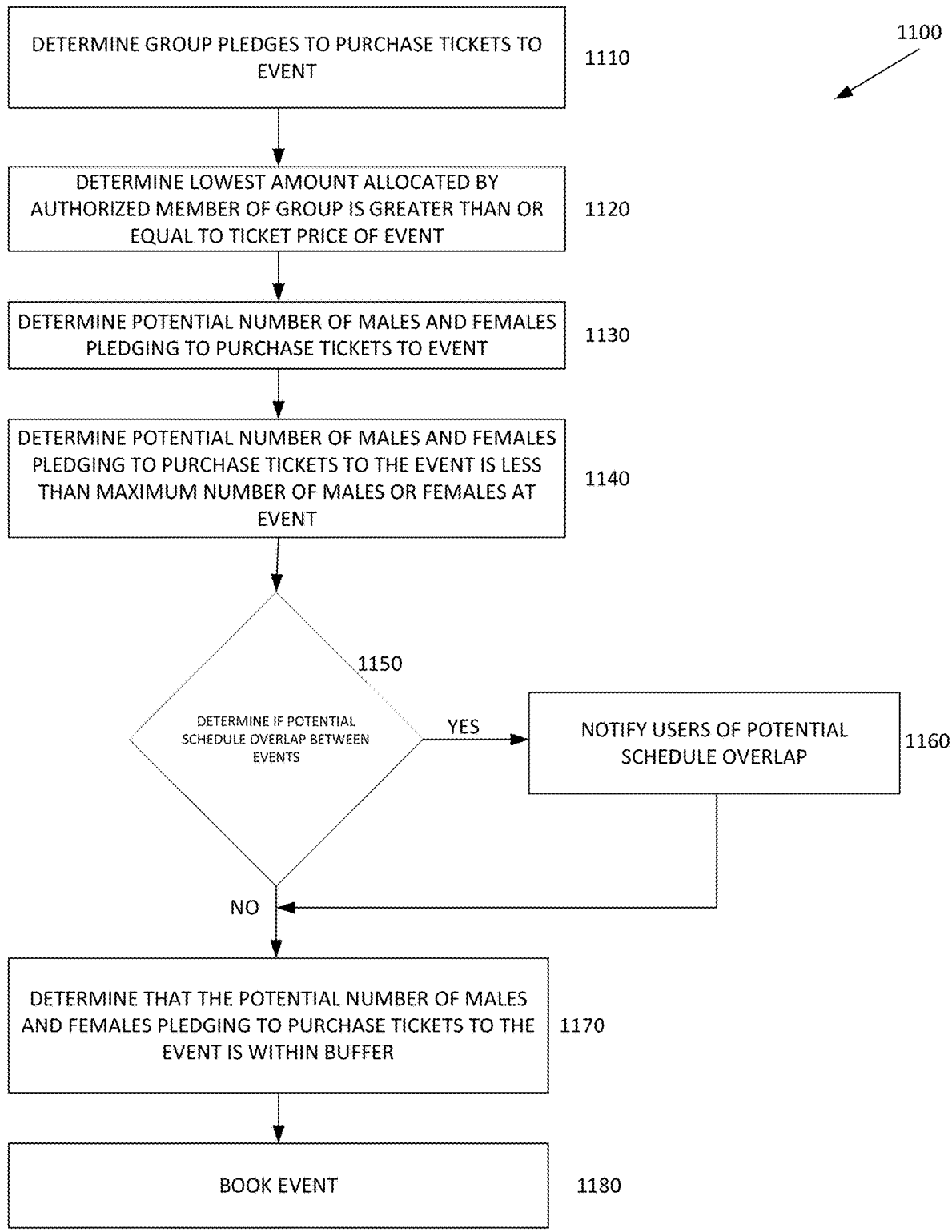
FIG. 11 depicts one embodiment of a method of booking an event with potential scheduling conflicts.

FIG. 11 depicts a method 1100 of a user pledging to purchase tickets to an event. The operations of method 1100 presented below are intended to be illustrative. In some embodiments, method 1100 may be accomplished with one or more additional operations not described, and/or without one or more of the operations discussed. Additionally, the order in which the operations of method 1100 are illustrated in FIG. 11 and described below is not intended to be limiting.

In some embodiments, method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At operation 1110, it may be determined that a group has pledged to purchase tickets to an event. The group may be comprised of at least one user, wherein different users within the group have different user identifications. Each user within the group may have allocated money to purchase a ticket to an event. Operation 1110 may be performed by a group module that is the same as or similar to group module 171, in accordance with one or more implementations.

At operation 1120, it may be determined that the lowest amount allocated by an authorized member of a group is greater than or equal to the ticket price of an event. In embodiments, if the lowest amount allocated by an authorized member of a group is less that of the ticket price, then the pledge to purchase tickets may be denied. In other embodiments, the group may instead be placed on a waitlist. In other embodiments, the users of the group that have allocated an amount of money less than the ticket price may be placed on a waitlist, where they may be automatically taken off if the price drops below or equal to the amount of money they have allocated to the group. Operation 1120 may be performed by an event module that is the same as or similar to event module 172, in accordance with one or more implementations.

At operation 1130, a potential new number of males and females pledging to purchase tickets to the event may be determined, wherein the potential new numbers may be based on if the number of authorized males in the group and authorized females in the group requesting to pledge to purchase tickets to the event is added to the number of males and females, respectively, that are currently pledging to purchase tickets to the event. The crowd-funding server may not count a user with the same user identification twice by subtracting out duplicate pledges to purchase tickets that have the same user identification. For instance, if a user is in two groups and both groups have pledged to purchase tickets to a same event, the crowd-funding server may only count the user who is in both parties once. Operation 1130 may be performed by an event module that is the same as or similar to event module 172, in accordance with one or more implementations.

At operation 1140, it may be determined that the potential new number of males or females is not greater than the maximum number of males or females allowed at the event, respectively. If the potential new number of males or females is greater than the maximum number of males or females allowed at the event, the group may be placed on a waitlist. Operation 1140 may be performed by an event module that is the same as or similar to event module 172, in accordance with one or more implementations.

At operation 1150, it may be determined if there is potential schedule overlap between this event and an event that any user of this group has pledged to purchase tickets to in a different group. Operation 1150 may be performed by an event module that is the same as or similar to event module 172, in accordance with one or more implementations.

At operation 1160, responsive to determining that there is a potential schedule overlap between events at operation 1150, users with the potential schedule overlap may be notified of the potential schedule overlap. In further embodiments, the group and/or users may be denied from pledging to purchase tickets to an event if at least one user in the group has pledged to purchase tickets to a different event with an overlapping time and/or date in a different group. Operation 1160 may be performed by an event module that is the same as or similar to event module 172, in accordance with one or more implementations.

At operation 1170, if there is no potential scheduling overlap between events and/or if the group is allowed to pledge to purchase tickets to multiple events at the same time despite any potential event overlaps, the group may be allowed to pledge to purchase tickets to the event. Further, it may be determined that the number of males and females pledging to purchase tickets to the event with the group is greater than or equal to the corresponding male and female thresholds for the event but less than or equal to the corresponding maximum number of males and females at the event. Operation 1170 may be performed by an event module that is the same as or similar to event module 172, in accordance with one or more implementations.

At operation 1180, responsive to Operation 1170 the event may be booked. Further, all other pledges to purchase tickets to other events made by the group may be deleted, and each user within the group may automatically purchase tickets to the event. Operation 1180 may be performed by an event module that is the same as or similar to event module 172, in accordance with one or more implementations.

Figure 12:
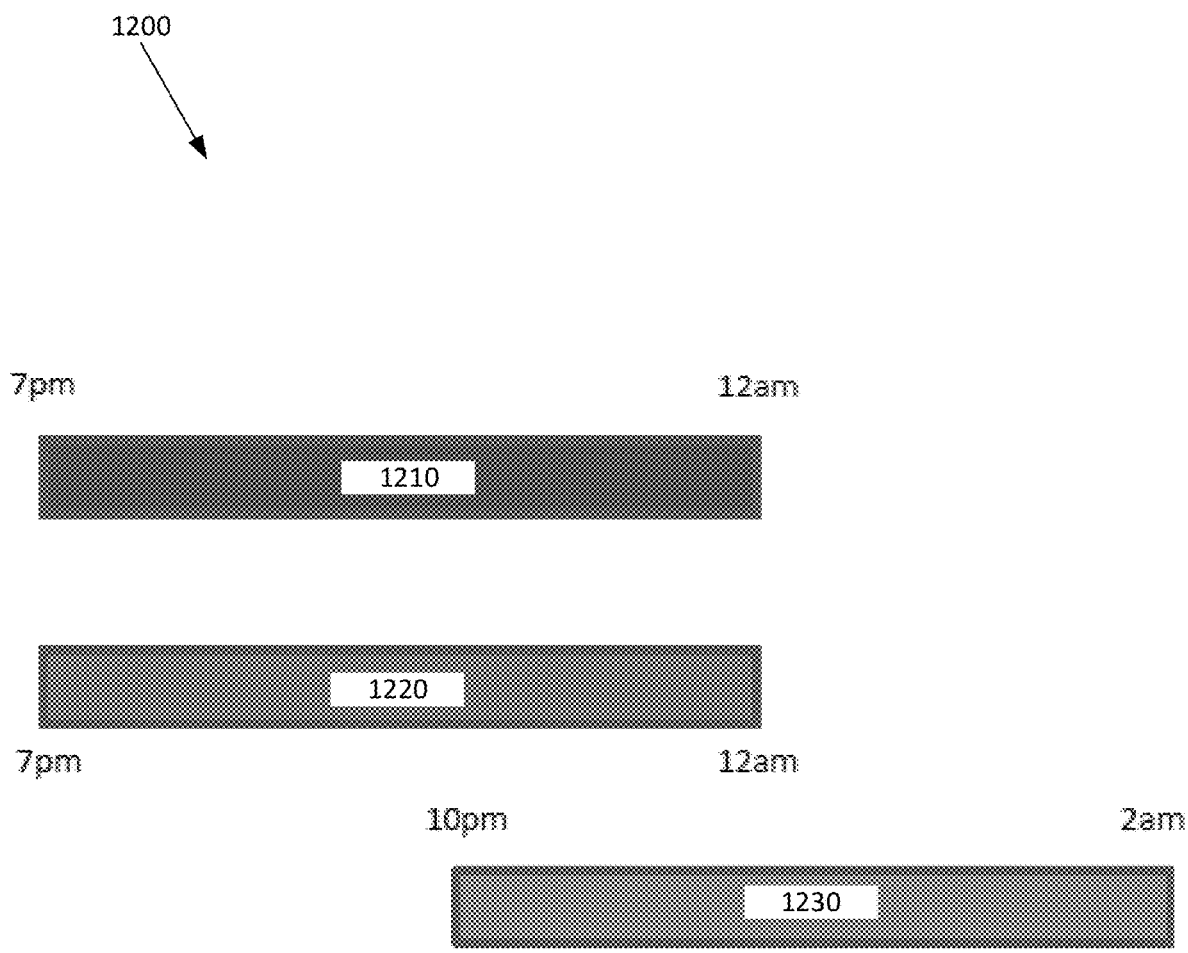
FIG. 12 depicts one embodiment of a table of multiple events taking place at the same time.

FIG. 12 depicts one embodiment of schedule 1200 with different events desiring to be held at the same venue, but have overlapping times. A first event 1210 has a start time of 7:00 PM and an end time of 12:00 AM, a second event 1220 has a start time of 7:00 PM and an end time of 12:00 AM, and a third event 1230 has a start time of 10:00 PM and an end time of 2:00 AM. However, in embodiments only a single event may be booked at a venue at a given time.

In embodiments, a crowd-funding server may accept invitations to host events from multiple sources, such as promoters, at the same time. However, only the first event to be booked may take place. Therefore, in embodiments, if second event 1220 is booked, the crowd-funding server may determine if there are other non-booked events at the same venue with overlapping times. In this embodiment, the crowd-funding server may determine that first event 1210 and third event 1230 have overlapping times with booked second event 1220, and thus may not occur.

The crowd-funding server may automatically delete the overlapping first event 1210 and third event 1230 responsive to second event 1220 being booked. When the overlapping events are deleted, the pledges to purchase tickets to those events may also be deleted.

Accordingly, the crowd-funding server may allow promoters to create events for the same venue at the same time, while allowing the promoters to compete with one another to book an event first. In embodiments, promoters can receive a commission for being the first to book an event.

Figure 13:
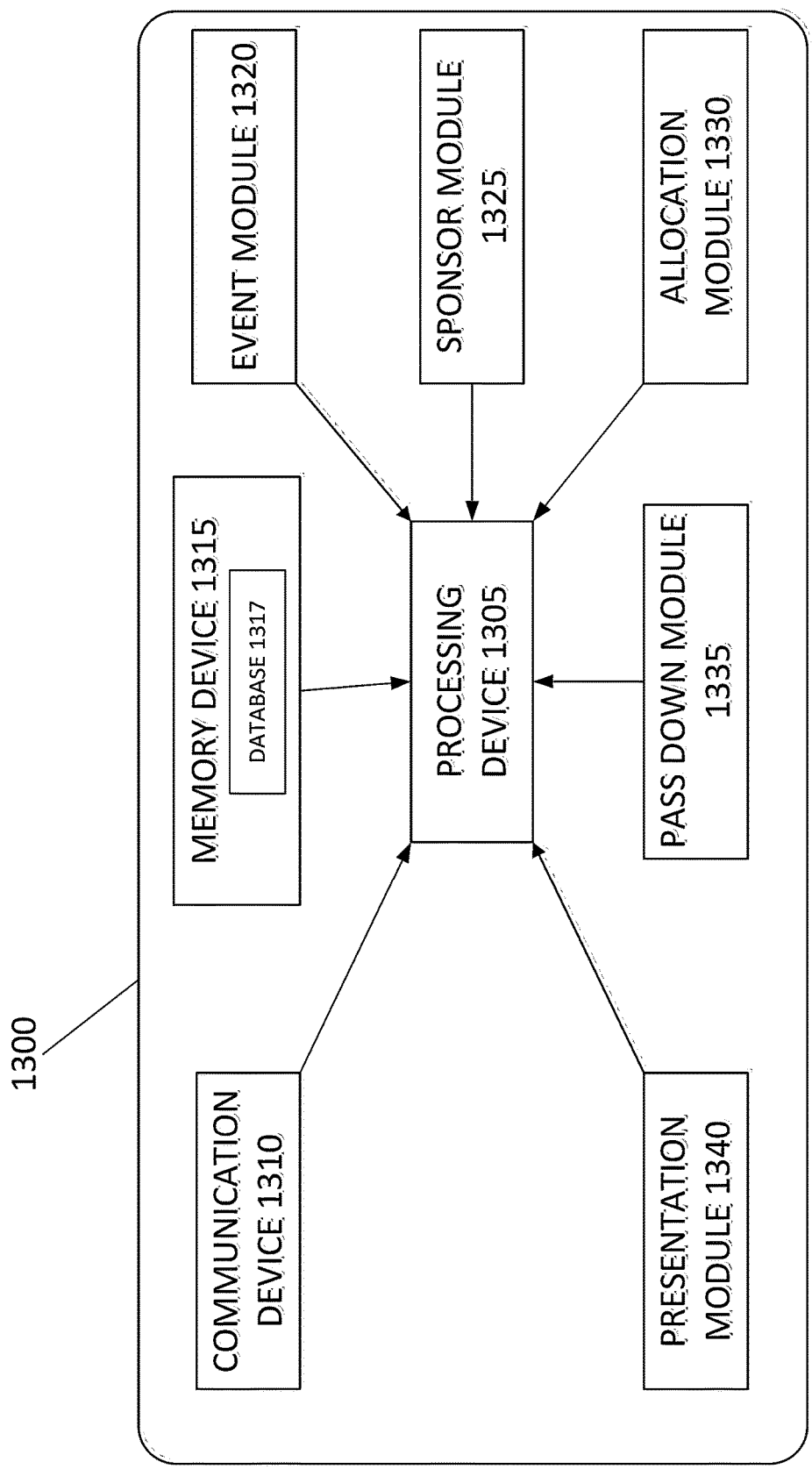
FIG. 13 depicts one embodiment of a crowd-funding server.

FIG. 13 depicts one embodiment of a crowd-funding server 1300. Crowd-funding server 1300 may be configured to allow a sponsor to pay a portion or all of the cost of an event. Responsive to a sponsor paying a portion or all of the cost of an event, ticket prices of the event may decrease. Elements depicted in crowd-finding server 1300 may be substantially the same as those depicted in crowd-funding server 110. For the sake of brevity, a further description of those elements is not included. Crowd-funding sever 1300 may include a processing device 1305, communication device 1310, memory device 1315, event module 1320, sponsor module 1325, allocation module 1330, pass down module 1335, and presentation module 1340.

Event module 1320 may be a hardware processing device configured to determine the number of tickets for an event, the cost of the event, and the cost per ticket of the event.

The number of tickets for an event may be based on the male and female thresholds for an event, the maximum number of males and females allowed at an event, the number of tickets desired to be sold at an event, or any other desired number. For example, in an embodiment there may be eight tickets for an event.

The cost of the event may be based on the total cost of the event, wherein the total cost of the event may be based on a desired profit for an event, the cost of drinks at the event, the cost of entertainment at the event, sponsor's commission, overhead, taxes, fees, etc. For example, in an embodiment the cost of an event may be $400.

The cost per ticket of the event may be based on the number of tickets for an event and the cost of the event. The cost per ticket of an event may be determined by dividing the total cost of the event by the number of tickets for the event. For example, if the cost of the event is $400 and there are eight tickets associated with the event, the cost per ticket may be evenly split to be $50 per ticket. One skilled in the art will appreciate that there may be other methods and systems to determine the cost per ticket associated with an event.

Sponsor module 1325 may be a hardware processing device configured to receive a sponsorship for the event. Sponsor module 1325 may be configured to receive the sponsorship for the event from a computing device associated with a sponsor. In embodiments, a sponsor may determine and select which events from a list of events to sponsor, and the sponsor may determine how much money they desire to allocate for the sponsorship. For example, a sponsor may desire to allocate $100 for an event, wherein part or all of the sponsorship may offset the total cost of the event. In embodiments, a sponsor for an event may dynamically change before an event occurs based on the amount of money the sponsor and a second sponsor allocated to the event. In embodiments, if a second sponsor allocated more money to the event than the first sponsor, then the second sponsor may become the sponsor for the event. The funds that the first sponsor put up for the event may be refunded back to the first sponsor, and the first sponsor may be notified that they have been "out-sponsored". Incentives for the sponsor could include watermarked photos, themed web pages, decorations at the event, etc.

Allocation module 1330 may be a hardware processing device configured to determine an updated cost per ticket of the event based on the sponsor sponsoring at least a portion of the event, wherein the updated cost per ticket of the event may be based on the total cost of the event, the number of tickets to the event, and the amount the sponsor allocated for the event. For example, if the total cost of the event is $400, there are eight tickets to the event, and the sponsor allocated $100 to sponsor the event, then the total cost of the event may be reduced from $400 to $300 based on the sponsorship, which may lower the cost of ticket from $50 per ticket to $37.50.

Pass down module 1335 may be a hardware processing device configured to determine an updated cost per ticket of the event based on the sponsorship sponsoring at least a portion of an event, wherein all or only a portion of the sponsorship is allocated to reducing the total cost of the event. Pass down module 1335 may be configured to allocate a first portion of the sponsorship to reduce the total cost of the event and allocate a second portion of the sponsorship as an incentive for a venue to obtain the sponsorship, and consequently lower to price for the users. In embodiments, the first portion and the second portion may be determined by any desired metric, such as a percentage of the total sponsorship, fixed amounts allocated to the first portion or the second portion, etc. For example, a sponsor may desire to allocate a sponsorship of $100 to an event, wherein pass down module 1335 may determine that the first portion should receive 75% of the sponsorship, or $75, and the second portion should receive 25%, or $25. Accordingly, $75 of the sponsorship may be utilized to reduce the cost per ticket at the event, and the remaining $25 of the sponsorship may be given to the venue of the event for obtaining the sponsor. In an embodiment where the total cost of the event is $400, the total cost of the event may be reduced from $400 to $325 based on the first portion. Thus, the cost per ticket to the event if the event has eight tickets may be $40.63. If an event is already booked when sponsored, then the price drop can be automatically credited back to each user's account that has purchased tickets to this event, or in other embodiments can be automatically refunded to each user's card that has purchased tickets to this event.

Presentation module 1340 may be a hardware processing device configured to present information of computing devices communicatively coupled to crowd-funding server 1300. In embodiments, presentation module 1340 may be configured to transmit information to computing devices associated with sponsors, wherein sponsors may view a list of events desiring a sponsor. In embodiments, the presentation module may show the age distribution of the users who have pledged to purchase tickets to an event or have already purchased tickets to the event. This allows sponsors to target certain age demographics. Presentation module 1340 may also be configured to present information associated with events to users of client computing devices, wherein the users may be presented with the cost of an event, tickets associated with an event, the price reduction for a ticket based on the sponsorship, etc. In embodiments, responsive to a sponsor sponsoring an event, information associated with the event may be presented to the user if the new price per ticket for the event is now lower than an amount allocated by the user to purchase a ticket to an event.

Figure 14:
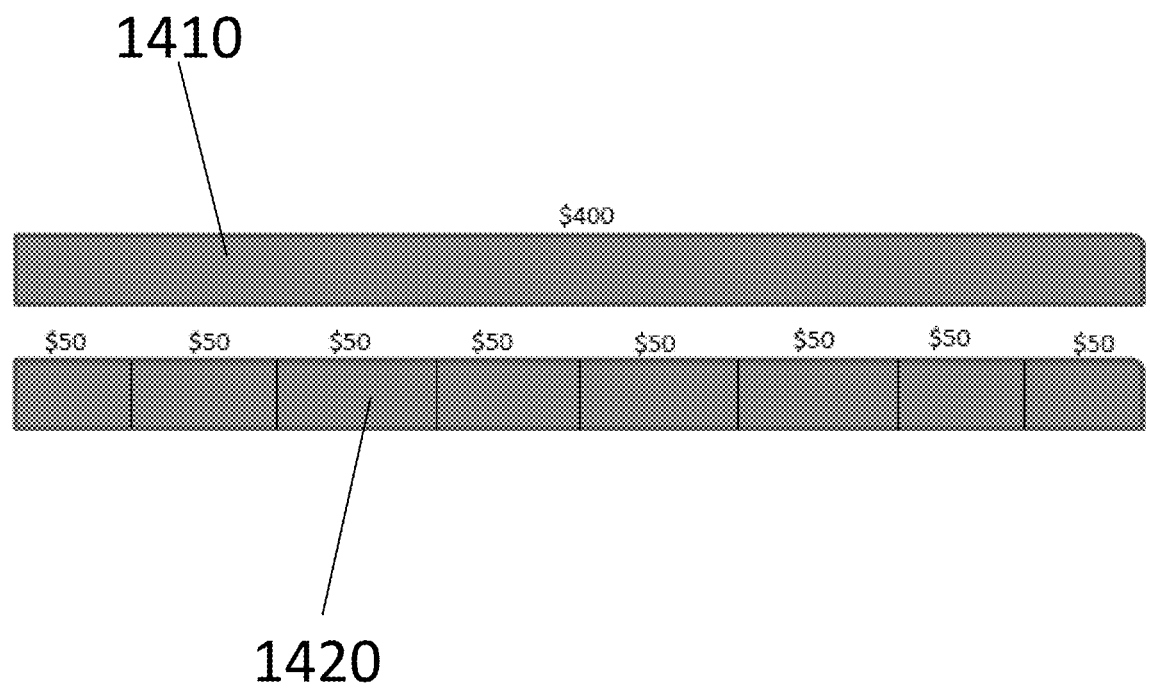
FIG. 14 depicts one embodiment of a table associated with the total cost of an event and ticket prices for the event.

FIG. 14 depicts a table including information associated with an event. The table may include a total cost of an event 1410 and a ticket price to the event 1420, wherein the ticket price to the event is based on the number of tickets for the event and the total cost of the event.

As depicted in FIG. 14, the total cost for the event is $400, and there are eight tickets to the event. Therefore, dividing the total cost of the event by the number of tickets for the event, the cost per ticket to the event is $50.

Figure 15:
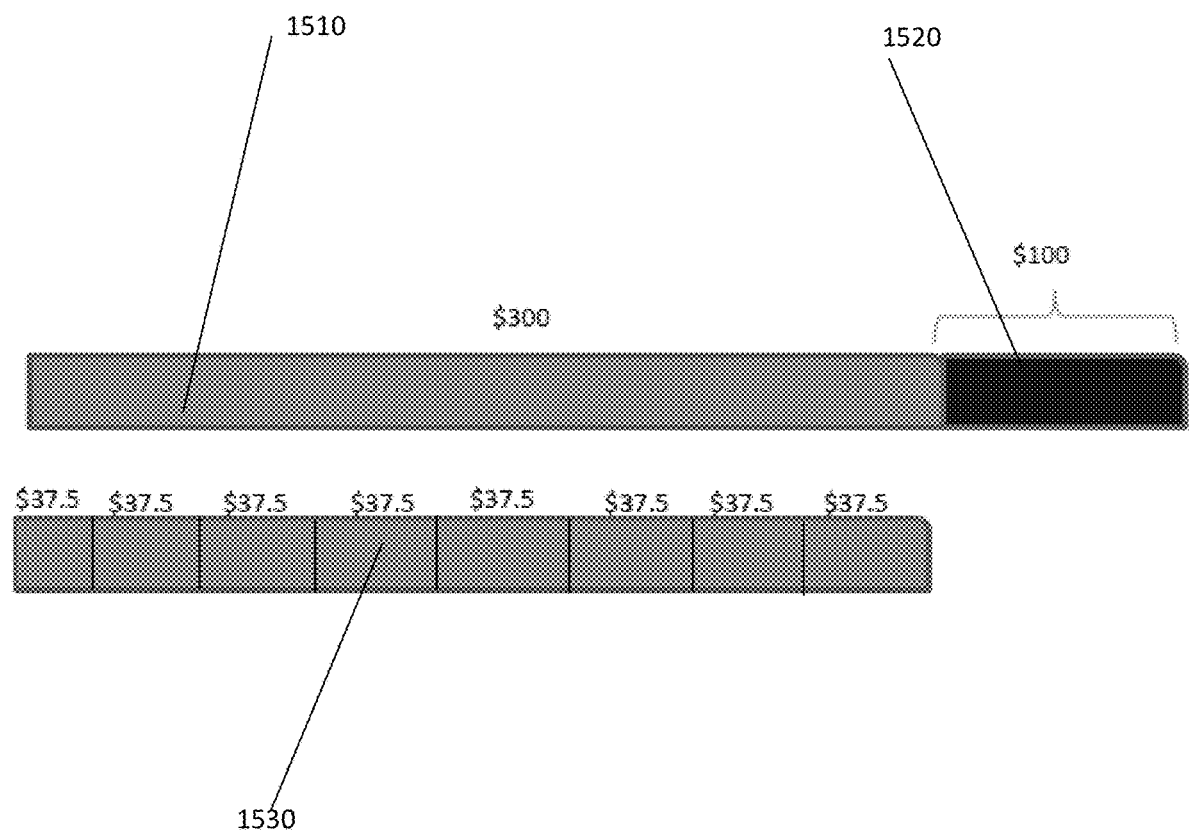
FIG. 15 depicts one embodiment of a table associated with the total cost of an event with a sponsor.

FIG. 15 depicts a table including information associated with an event, wherein a sponsor provides a sponsorship for the event. The table may include the total cost of the event 1510 based on the sponsorship, the sponsorship 1520, and the ticket price to the event 1530 based on the total cost of the event 1510 and the sponsorship 1520.

As depicted in FIG. 15, based on a sponsorship 1520 of $100 the total cost of the event 1510 may be reduced from $400 (as depicted in FIG. 14) to $300. Therefore, the ticket price 1530 to the event may be adjusted based on the sponsorship 1520. Accordingly, the ticket price 1530 to the event may be reduced from $50 to $37.50. If this event is already booked, then the price drop can be automatically credited back to each user's account that has purchased tickets to this event, or can be automatically refunded to each user's card that has purchased tickets to this event.

Figure 16:
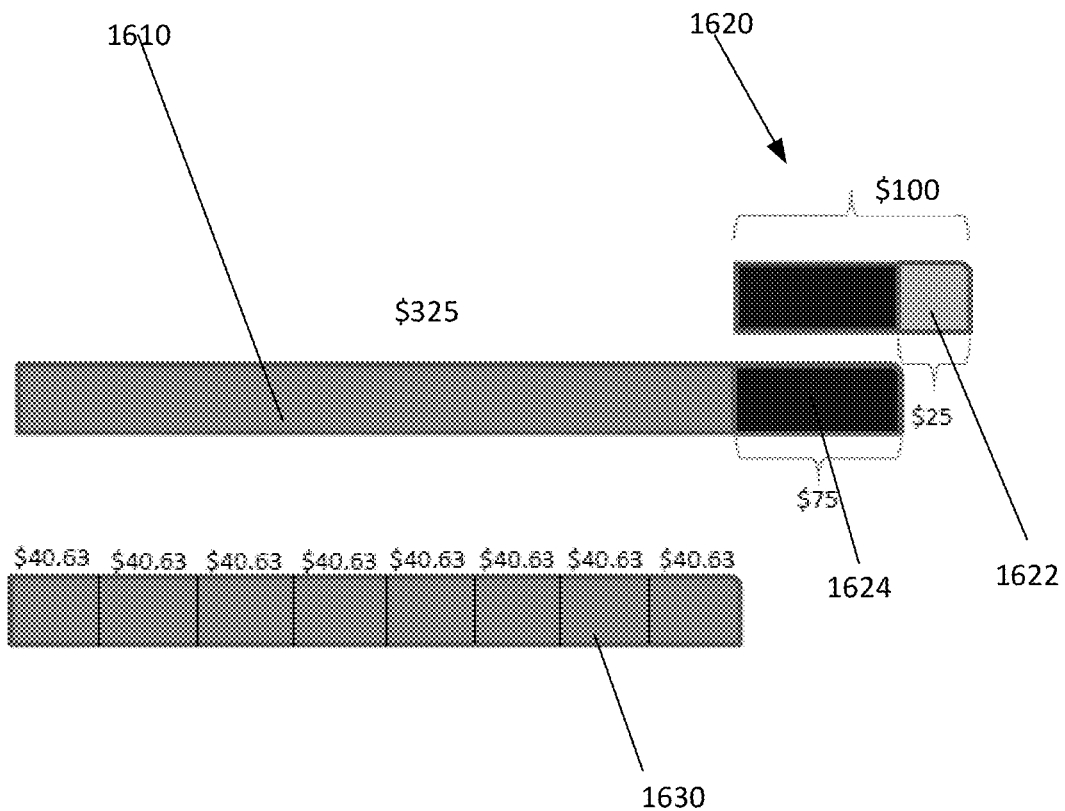
FIG. 16 depicts one embodiment of a table associated with the total of an event with a sponsor, wherein the sponsorship is divided into two parts.

FIG. 16 depicts a table including information associated with an event, wherein a sponsor provides a sponsorship to the event. The table may include the total cost of the event 1610 based on the sponsorship, the sponsorship 1620, and the ticket price to the event based on the total cost of the event 1610 and the sponsorship 1620.

As depicted in FIG. 16, a sponsor may have pledged a sponsorship 1620 for $100. The sponsorship 1620 may be allocated into two parts. A first part 1622 of the sponsorship 1620 may be allocated to the venue, and the second part 1624 of the sponsorship 1620 may be allocated to reducing the ticket price 1630 to the event. Accordingly, if the original total cost of an event is $400, and the second part 1624 of the sponsorship 1620 is $75, the resulting total cost of the event 1610 may be $315.

Furthermore, the price per ticket to the event may be based on 1) the number of tickets to the event, 2) the original total cost of the event, and 3) the second part 1624 of the sponsorship associated with reducing ticket prices 1630 to the event. By reducing the total cost of the event 1610 by $75, the new cost of the event may be $325. Thus, each ticket 1630 to the event may be $40.63.

Figure 17:
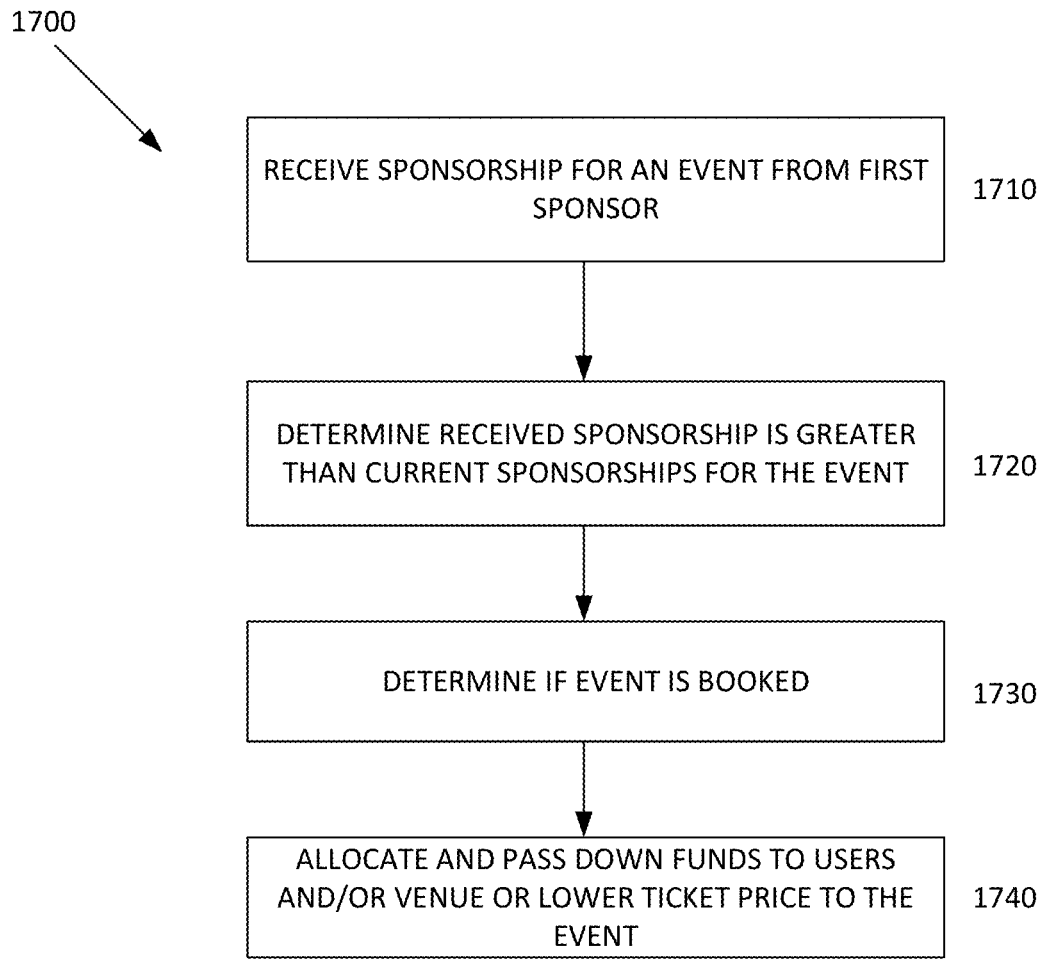
FIG. 17 depicts one embodiment of a method for determining a sponsor for an event.

FIG. 17 depicts a method 1700 of a sponsor sponsoring an event. The operations of method 1700 presented below are intended to be illustrative. In some embodiments, method 1700 may be accomplished with one or more additional operations not described, and/or without one or more of the operations discussed. Additionally, the order in which the operations of method 1700 are illustrated in FIG. 17 and described below is not intended to be limiting.

In some embodiments, method 1700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1700 in response to instructions stored electronically on an electronic storage medium. The one or more processing devices may include one or more devices configured through hardware, firmware, and/or software to be specifically designed for execution of one or more of the operations of method 1700.

At operation 1710, a sponsorship for the event may be received from a first sponsor. Operation 1710 may be performed by a sponsor module that is the same as or similar to sponsors module 1325, in accordance with one or more implementations.

At operation 1720, it may be determined that the sponsorship received from the first sponsor is greater than the current sponsorship for the event received from a second sponsor. If a second sponsor had previously transmitted a sponsorship to the event that is less than the sponsorship received from the first sponsor, then the funds associated with the second sponsor may be refunded to the second sponsor, and a notification may be transmitted to the second sponsor indicating that they are no longer the sponsor for the event. If the sponsorship received from the first sponsor is less than the current sponsorship, then the sponsorship may be denied. Operation 1720 may be performed by a sponsor module that is the same as or similar to sponsors module 1325, in accordance with one or more implementations.

At operation 1730, it may be determined if the event has been booked. Operation 1730 may be performed by an event module that is the same as or similar to sponsors module 1320, in accordance with one or more implementations.

At operation 1740, if it is determined that the event is booked the funds associated with the sponsorship may be divided and passed down to the users attending the event and/or the venue hosting the event. If it is determined that the event is not booked, the ticket prices for the event may be lowered. In embodiments where the venue is getting an incentive associated with the sponsorship, the venue may receive the incentive responsive to the event being booked. Operation 1740 may be performed by an allocation module and/or pass down module that are the same as or similar to allocation module 1330 and/or pass down module 1335, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Figure 18:
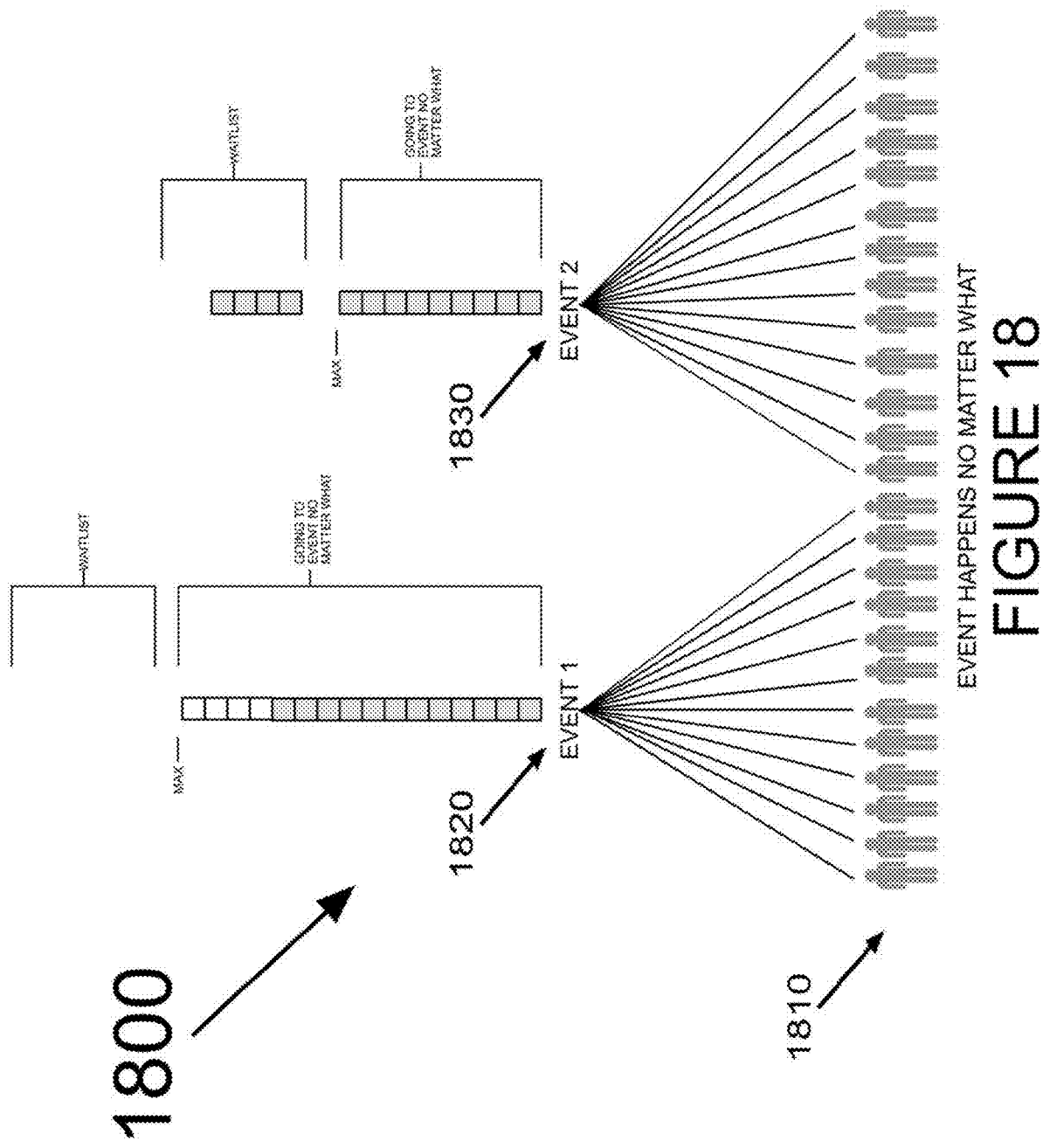
FIG. 18 depicts one embodiment of the status quo of booking events.

In FIG. 18 we see the state of the art for selling event tickets on the internet. Events operate independent of each other, and each event happens no matter what. Every event has a max threshold; if the number of guests passes this threshold they are put on a waitlist.

Event 1 1820 has 4 tickets remaining to be sold, and may be at risk of losing money if it can not find buyers for the remaining 4 tickets. Event 2 1830 has reached its maximum capacity, and has put begun putting people on the waitlist.

If multiple client requests are allowed to be processed concurrently by multiple threads/processes, an event's state becomes a shared resource and needs to be protected/considered a critical section.

To demonstrate why critical sections are needed, say that there is one spot left before the event hits its max threshold. If 5 people on 5 different computing devices simultaneously request the last ticket, and if the server spins up a unique process/thread for each user, there may be a race condition. Each process will at the same time read the state of the event and see that there is one spot left (the event's current state), and each will purchase the ticket, causing the event to go over the max threshold. The end result of concurrently processing ticket purchases for an event must be the same as if each purchase request was processed one-by-one, serially (i.e. without overlapping).

In embodiments, a blocking algorithm can be used to do this. For example, say two simultaneous purchase requests come in, and two concurrent processes are spun up to process these requests. The system would allow only one process to obtain an exclusive lock (mutex, semaphore, etc.) for the event (causing the second process to wait for the lock to be released), process the pledge and commit the new state, and then release the lock so that the second process can acquire the lock, read the new state and process the remaining purchase request.

In embodiments, a non-blocking algorithm can be used. If two, simultaneous purchase requests come in, and two processes are spun up to process these requests concurrently, they would both read the state of the network, process their respective pledge, and then try to commit the new state. However, when they try to commit the state, they first read whether the current state of the event has changed, and if it has changed they either abort or reprocess the request given this new state. In embodiments, other threads/processes are not allowed to change the state while this thread compares and swaps. In embodiments, exponential backoff or a similar algorithm can be used to improve system performance.

In embodiments, an optimistic concurrency control algorithm can be used. If two, simultaneous purchase requests come in, and two processes are spun up to process these requests concurrently, they would both read the state of the event, process their respective pledge, and then then wait to obtain a lock. When they obtain the lock, they reread the state of the event and see if it has changed. If the state of the event has not changed then they commit the changes, otherwise they abort and/or reprocess the pledge given this new state.

Figure 19:
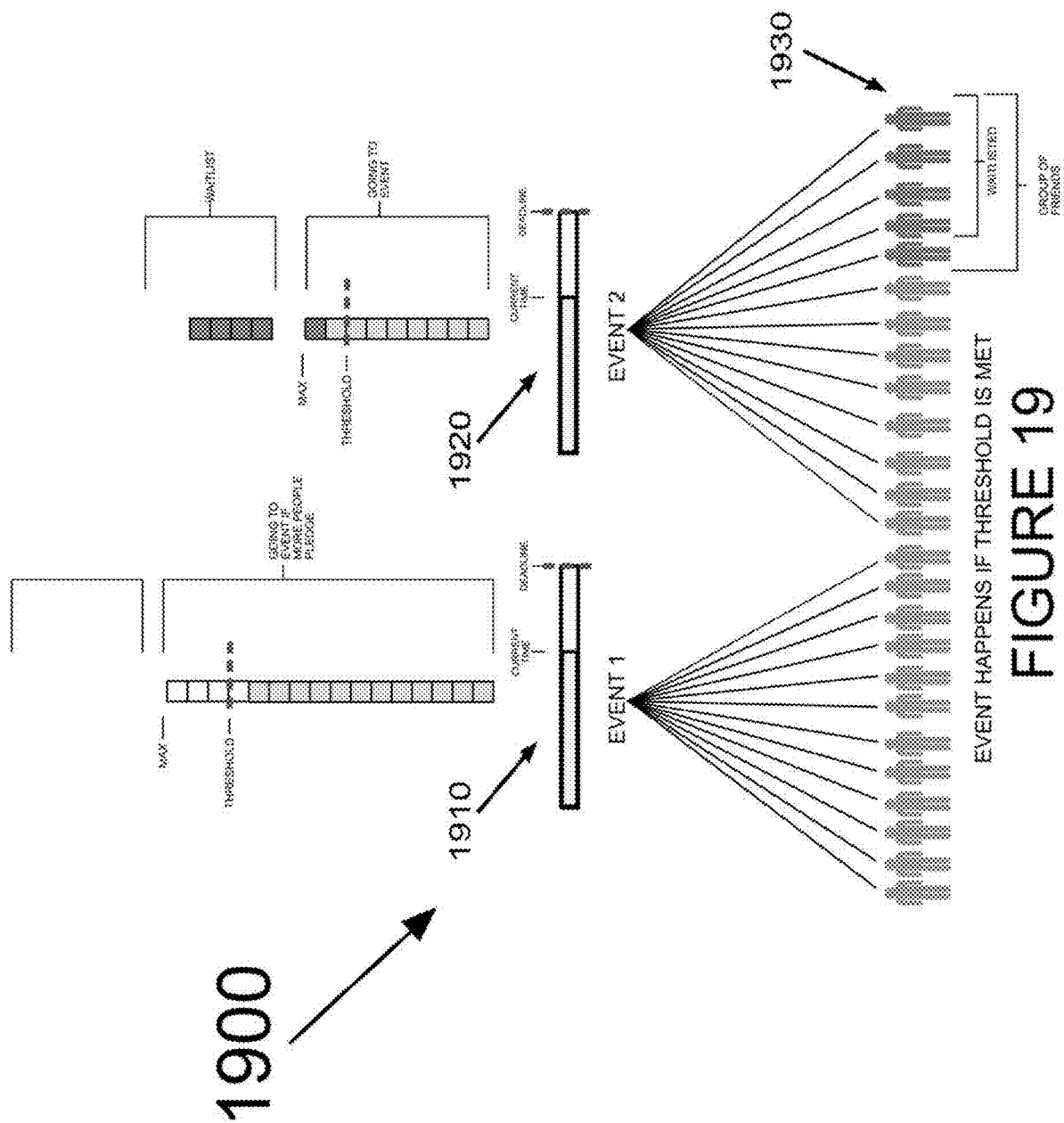
FIG. 19 depicts one embodiment of the state of the art for crowdfunding events.

In FIG. 19 we see the state of the art social graph 1900 for crowdfunding event tickets on the internet. Events operate independent of each other. From FIG. 18, we have added deadlines that events must be booked by, and thresholds that must be met by said deadlines. If the threshold is not met by the deadline, the event is abandoned.

Users pledge to go to an event on the condition that the threshold of attendees will be met. When the number of users crosses the threshold, the event automatically books. This crowdfunding system frees the event creator from risk if sufficient demand is not met.

In FIG. 19, Event 1 1910 will not book unless 2 more people pledge the event. Event 2 1920 has been booked since it has passed its threshold. Because Event 2 has also passed its max threshold, guests have begun being placed on the waitlist.

There are several problems with the current state of the art of crowdfunding events. Firstly, it does not allow a group of friends to all sign up together as one, simultaneously/atomically, in an all or nothing fashion. Considering that most people go to events with at least some friends, this can be a major problem. In the bottom right of the figure, we see a group of friends indicated in red 1930. Only one was able to sign up for the event in time; the rest signed up too late and were put on the waitlist. This is going to be a real bummer for the one user who will now be going to the event by himself or herself.

Secondly, the current state of the art does not take into account the male to female ratio of the event. This can lead to there being too many men or too many women at the event. What is needed is a crowdfunding system that takes users' sex into account, and enforces a ratio to ensure a low probability that there will be too many men or women.

Thirdly, it does not allow groups to increase their chances of booking an event. If a sex ratio is enforced, the odds of an event failing to get booked are increased. Say you and you group of friends want to go out Saturday night 3 weeks from now to celebrate a birthday. You want to make sure you book an event, and are ok with not going to you first choice and instead your second, third, or fourth choice if it increases your chances of booking an event.

The current status quo does not allow users to pledge multiple, mutually exclusive, pending events without fear of double booking. The state of the art does not automatically delete group pledges for other events if one pledged event gets booked. Therefore, if a group wants to increase their odds of attending an event on a certain date, they must monitor the crowdfunding service for one of the events pledged getting booked, and quickly delete all other pledges before getting double-booked.

To get to the current invention at hand, we present three steps.

Figure 20:
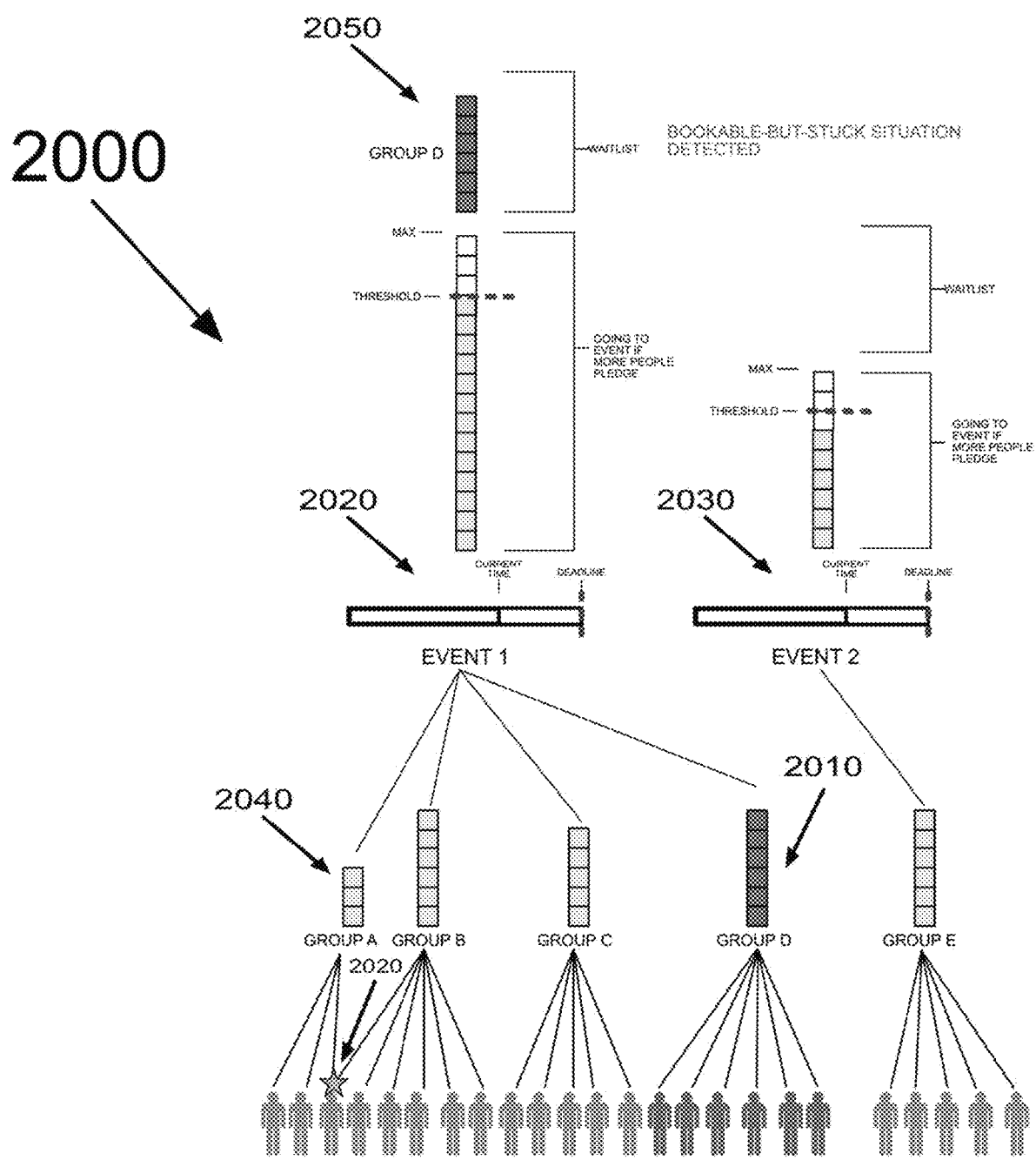
FIG. 20 depicts the step of allowing users to group up

In FIG. 20, we see the first step in improving the state of the art social graph 2000 for crowdfunding event tickets on the internet by allowing users to group up into groups.

Group D 2010 was put on the waitlist instead of only some of the group members being able to go. In embodiments, we allow users to join multiple groups, as seen by the green star 2020. The system takes this into account and does not double count him or her in Event 1 2020.

Some interesting scenarios appear when users are allowed to group up. First, the possibility for a "bookable-but-stuck" situation is now introduced. Such a situation means that there is sufficient demand to book the event, but due to the order in which the pledges were processed, the event is still pending. At this step of the invention, this will only happen if there is a group in the waitlist larger than the buffer zone (if smaller, then they can either fit, or the event is booked).

For example, we could take Group A 2040 out of Event 1 2020 so that Group D 2010 can fit, and this would cause the event to book. In embodiments, bookable-but-stuck situations are monitored for, and when detected the order of pledges are automatically moved around to book the event. In embodiments, this is only done when the event is reaching its deadline.

Another interesting aspect is that, unlike traditional events where a waitlist only forms on booked events, a waitlist can form on an unbooked event (with a group being larger than the buffer zone). For example, Event 1 is not booked, yet Group D is on Event 1's waitlist 2050.

Figure 21:
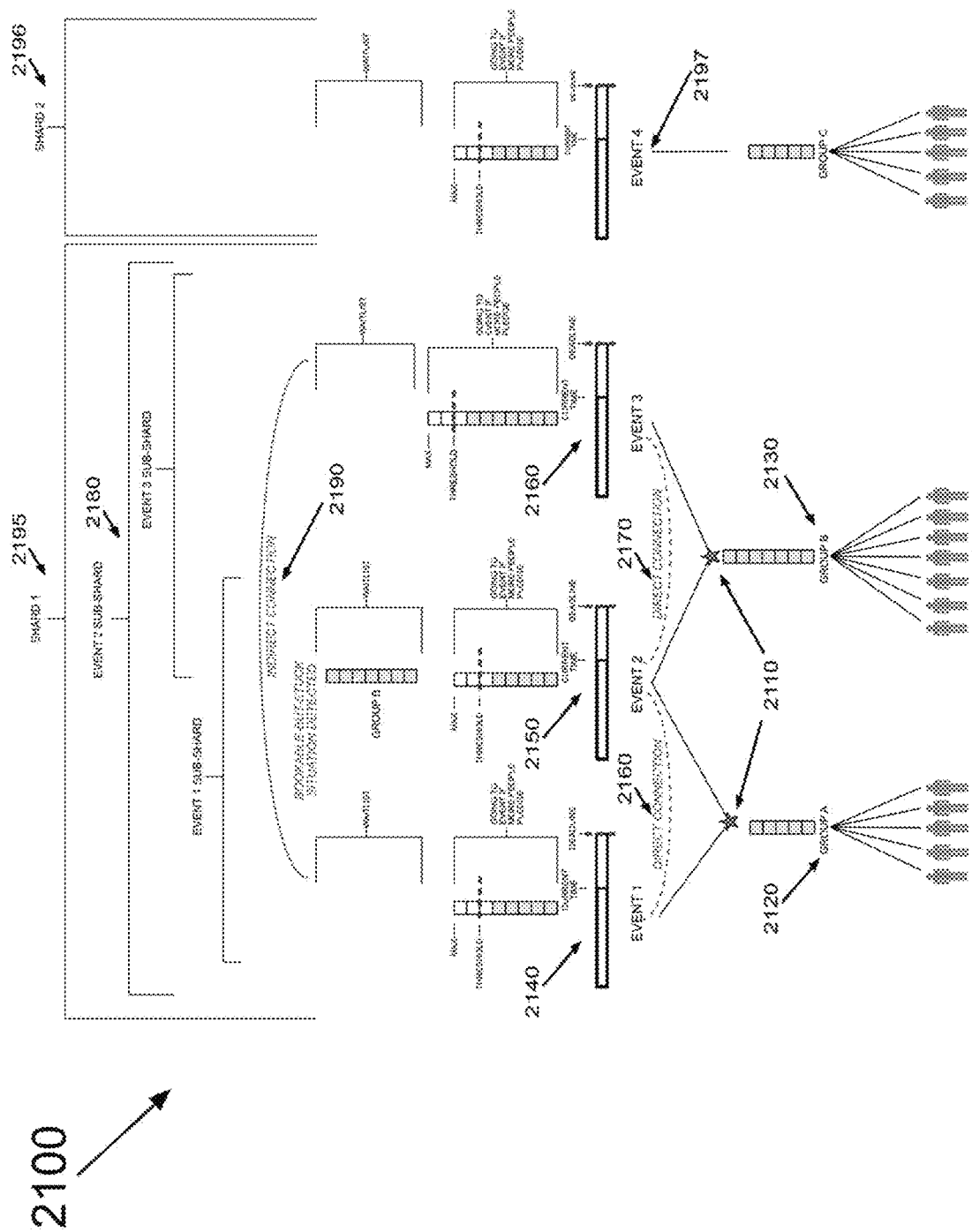
FIG. 21 depicts the step of allowing groups of users to sign up for multiple mutually exclusive pending events.

In FIG. 21, we see the second step in improving the state of the art social graph 2100 for crowdfunding event tickets on the internet by allowing groups to sign up for multiple, mutually exclusive, pending events. This is indicated by the red stars 2110. In this figure, Groups A 2120 and B 2130 have decided to increase their chances of booking an event by pledging both Event 1 2140 and 2 2150 and Events 2 2150 and 3 2160 respectively.

Allowing groups to do this means that events are no longer independent of one another; what happens to one event can affect another event. For example one event getting booked can cause pledges in another event to be deleted. If events are allowed to be in a bookable-but-stuck state, then these new deletions could cause this event to get booked, and this event getting booked can cause other events to get booked, etc. etc.

Consequently, processing pledges is no longer as parallelizable of a task. Before, if using a blocking algorithm, a process only had to acquire a lock associated with a certain event in order to change its state. Now it would require a lock on a multitude of events. Likewise with non-blocking algorithms, it now would be required to check more than one events state/history before committing updates.

For example, Group A 2120 has pledged Event 1 2140 and 2 2150. If one new group of three people pledges Event 1, and at the same time another new group of three people pledges Event 2, and this causes both events to get booked simultaneously, then Group A will see that they are going to two events even though they only wanted to attend one. The database will have been corrupted. The end result of concurrently processing pledges of the two new groups of three in this example need to be equivalent to that as if they were processed serially.

However, at scale, with millions of concurrent users, we do not want processes having to acquire a lock on all events. Likewise, we do not want a non-blocking algorithm to have to reprocess a pledge simply because a change anywhere on the network has taken place since the initial read. Having to lock or look at all events would lead to too much contention between the many concurrently running processes and consequently a slower network/system.

While processes will indeed need to lock or compare to a multitude of events, it does not need to lock or compare all events. Instead, the system can keep track of which events are "directly connected" to each other via mutually exclusive pledges, and in embodiments keep track of which events are "indirectly connected" to each other too.

In embodiments, bookable-but-stuck situations are not allowed. In such an embodiment, a single given event can only affect events that it is directly connected to. This is because in such an embodiment a deletion of pledges cannot lead to an event getting booked and other pledges getting deleted. In the figure, Group A has pledged Events 1 and 2, causing Events 1 and 2 to be directly connected with one another 2160. Events 2 and 3 are directly connected to each other 2170 due to Group B's mutually exclusive pledges to both.

Consequently in such embodiments, the system would only need to keep track of these direct connections. When a pledge for an event is processed, the process would have to acquire locks on events with direct connections to the event being pledged, and not the entire network. If using a non blocking algorithm, the state being compared too is only of these directly events. This is depicted in the figure by the sub-shards 2180.

In embodiments, bookable-but-stuck situations are allowed. In such an embodiment, the system needs to keep track of which events are "indirectly connected" as well. While no groups signed up for Event 3 have also signed for Event 1 and vice versa, Events 1 and 3 are indirectly connected to each other by Event 2. Group A created a direct connection between Events 1 and 2, and Group B created a direct connection between Events 2 and 3, the combination causing an indirect connection 2180 between Events 1 and 3.

In such embodiments where bookable-but-stuck situations are allowed, deletion of pledges due to a first event getting booked can cause a second event in a bookable-but-stuck situation to get booked. This in turn could cause a third event in a bookable-but-stuck situation to also get booked, etc. etc. etc. Therefore when processing a pledge in such an embodiment, we can put all events that are indirectly or directly connected into a "shard". This shard is what a process will lock in locking algorithms, and compare to when committing in a non-blocking algorithm.

In the figure, Events 1, 2, and 3 are all in Shard 1 2195. No one signed up for Event 4 2197 have signed up for any of the events in Shard 1, and therefore Event 4 is in its own Shard 2 2196. If Group C decided to pledge Event 3 too, then the two shards would merge into one.

Not having to lock the entire network to process a single pledge, or not having to compare the entire state of the network to itself in a non-blocking algorithm, by utilizing event connections is a great improvement in computational speeds.

Figure 22:
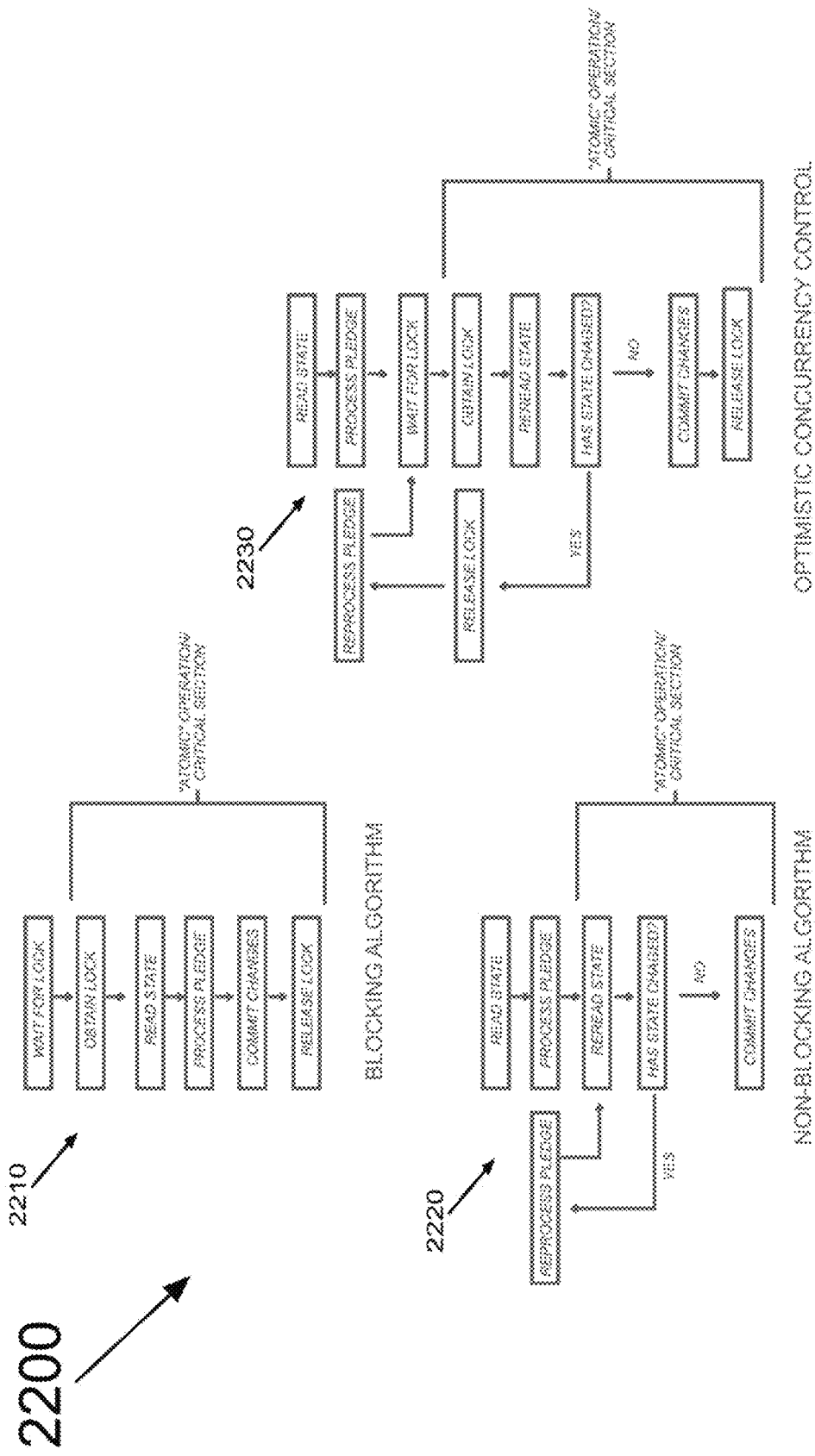
FIG. 22 depicts embodiments of synchronizing concurrent threads trying to access a shared resource/critical section.

FIG. 22 illustrates methods 2200 illustrating common ways to ensure that the result of concurrently processing pledges is equivalent to that of which if they were processed serially. The operations of methods 2200 presented below are intended to be illustrative. In some embodiments, methods 2200 may be accomplished with one or more additional operations not described, and/or without one or more of the operations discussed. Additionally, the order in which the operations of methods 2200 are illustrated in FIG. 22 and described below is not intended to be limiting.

In some embodiments, methods 2200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 2200 in response to instructions stored electronically on an electronic storage medium. The one or more processing devices may include one or more devices configured through hardware, firmware, and/or software to be specifically designed for execution of one or more of the operations of methods 2200.

In a blocking algorithm 2210, a thread/process would wait to obtain a lock to the event being pledged and all events directly connected to it. In embodiments where bookable-but-stuck situations can occur, locks to indirectly connected events are also obtained. The process reads the state and then processes the pledge. Once processed it commits the changes and releases the lock.

In embodiments a non blocking algorithm is used 2220. This reads the state of the event and all events directly connected to it. In embodiments where bookable-but-stuck situations can occur, it reads events that are indirectly connected to it too. It then processes the pledge, and then right before committing its changes to the global state, it checks and makes sure that the state it just read has not changed. If it has then it reprocesses the pledge with this new state. If it has not changed it commits is changes to the global state.

In embodiments an optimistic concurrency control algorithm is used 2230. This reads the state of the event and all events directly connected to it. In embodiments where bookable-but-stuck situations can occur, it reads events that are indirectly connected to it too. It then processes the pledge, and waits for a lock. Once it claims a lock it rereads the state it read and checks whether it has changed. If it has the lock is released and the pledge is reprocessed with this new state. If not then the changes are committed to the global state and the lock is released. This embodiment is optimistic in that it believes the state that it just read wont change while processing the pledge.

In all embodiments, the key is that we can reduce contention between processes/threads by utilizing event connections. Such strategies should even be able to be used in eventually consistent algorithms.

Figure 23:
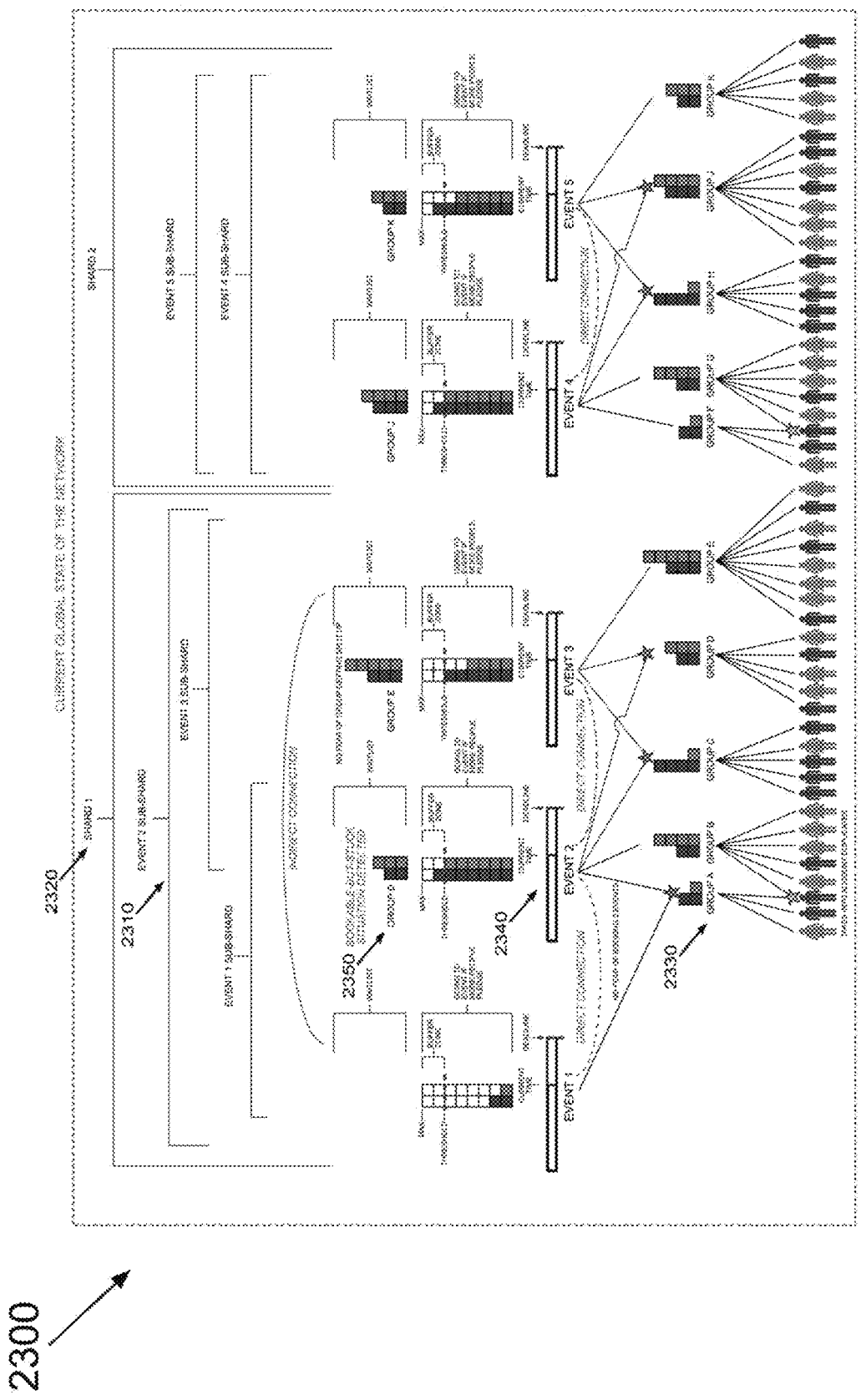
FIG. 23 depicts one embodiment of a social graph of all previous steps plus taking into account male and female counts.

In FIG. 23, we see the final step in improving the state of the art social graph 2300 for crowdfunding event tickets on the internet by taking into account the sex of users, and set male and female thresholds for all events. This increases the chance of an event not booking, and increases the chances of an event being in a bookable-but-stuck situation. Consequently, the efficiencies gained from the previous steps are greatly enhanced. Locks/rechecks are still performed on either sub-shards 2310 or shards 2320 (direct or direct+indirect connections respectively), rather than the entire network.

Now groups no longer need to be bigger than the buffer zone in order to get put on the waitlist for an unbooked event. Instead, either the male count or female count of the group can cause the group to get put on the waitlist.

In the figure, Group A 2330 could be removed from Event 2 2340 so that Group D 2350 could fit and consequently book the event.

Figure 24:
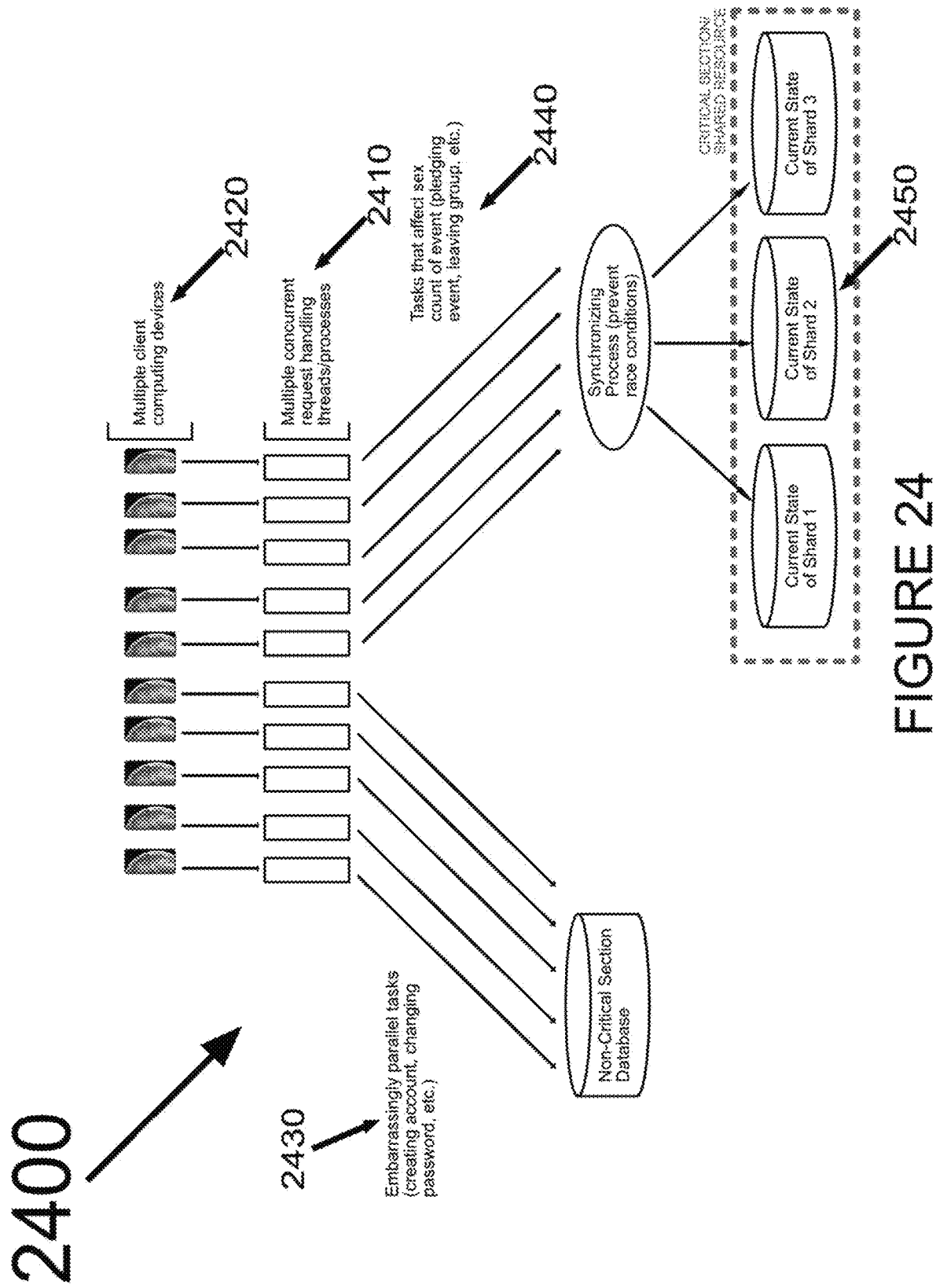
FIG. 24 depicts one embodiment of how multiple concurrent requests can be handled using a synchronizing process and sharding Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

Depicted in FIG. 24, is firstly a multitude of processes/threads 2410 running concurrently, processing concurrent requests from a multitude of client computing devices 2420. Processes/threads that are doing "embarrassingly parallel" tasks 2430 like creating an account and changing password are allowed to do what they want without interference of other threads. Tasks that deal with the male or female counts of events 2440 need to be synchronized so that there are no race conditions. This can be done using algorithms shown in FIG. 22 and others. In embodiments, the system uses the connections between events via mutually exclusive pledges to reduce contention between the different processes/threads, speeding up processing time and preventing data corruption. This is shown in the figure by dividing the shared resource into shards 2450, which in embodiments can be dynamic in nature.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

What is claimed is:

1. A computer-implemented method comprising:
receiving, by one or more processors of a crowdfunding system, from a plurality of venue computing devices, venue information and event information, maintaining a group-event sex count graph for groups and events of a crowdfunding network, the group-event sex count graph including connections between groups and events, each type of connection based on an action performed by each member of the social network, wherein at least some of the different types of connections include an event pledge;
receiving, by one or more processors of a crowdfunding system, a request from a first member of a first group of the crowdfunding network to identify candidate events, from the collective set of events on the crowdfunding network;
identifying, from the crowdfunding network, a subset of candidate events from the collective set of events for the first member;
populating the first member's graphical user interface with event information about the subset of candidate events selected for the first member;
receiving, from a plurality of user graphical user interfaces, mutually exclusive pledge requests for the events on the crowdfunding network concurrently from multiple groups on the crowdfunding network, each individual pledge request on the crowdfunding network indicating that when the event associated with a corresponding pledge request books the group associated with the corresponding pledge request will attend the event associated with the corresponding pledge request and if required will be charged a price associated with the event that is associated with the corresponding pledge request, and indicating that when the event associated with the corresponding pledge request books all remaining pledges of the group associated with the corresponding pledge request will be deleted;
determining by the crowdfunding network whether to book any of the collective set of events associated with any pledge request on the crowdfunding network;
processing two or more pledges on the crowdfunding network concurrently by two or more processes;
ensuring that the result of the processing two or more pledges requests on the crowdfunding network concurrently is equivalent to that of which if the two or more pledge requests were processed serially, and ensuring no race condition bugs, by utilizing a critical section;
indicating, if any of the collective set of events gets booked, on the graphical user interface of users on a list of the now booked event;
utilizing any of the collective set of event's connections with one another via the mutually exclusive pledges on the crowdfunding network to reduce contention between the processes that are concurrently processing pledges on the crowdfunding network;

automatically deleting pledges on the crowdfunding network when an any of the collective set of events books.

2. The computer-implemented of claim 1, further comprising:

automatically removing one or more groups from a list of any of the collective set of events and putting them on a waitlist, and automatically removing one or more groups from a waitlist of any of the collective set of events and putting them on a list, in order to book an unbooked bookable-but-stuck event.

* * * * *